(12) United States Patent
He et al.

(10) Patent No.: US 11,183,729 B2
(45) Date of Patent: Nov. 23, 2021

(54) BATTERY PACK, VEHICLE AND ENERGY STORAGE DEVICE

(71) Applicant: BYD COMPANY LIMITED, Guangdong (CN)

(72) Inventors: Long He, Shenzhen (CN); Huajun Sun, Shenzhen (CN); Wenfeng Jiang, Shenzhen (CN); Zhipei Lu, Shenzhen (CN); Weixin Zheng, Shenzhen (CN); Jianglong Tang, Shenzhen (CN); Yan Zhu, Shenzhen (CN); Xinyue Wang, Shenzhen (CN); Kefeng He, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 0 days.

(21) Appl. No.: 17/048,947

(22) PCT Filed: Jun. 21, 2019

(86) PCT No.: PCT/CN2019/092394
§ 371 (c)(1),
(2) Date: Oct. 19, 2020

(87) PCT Pub. No.: WO2020/143178
PCT Pub. Date: Jul. 16, 2020

(65) Prior Publication Data
US 2021/0175572 A1    Jun. 10, 2021

(30) Foreign Application Priority Data

Jan. 9, 2019  (CN) .......................... 201910020925.5
Jan. 9, 2019  (CN) .......................... 201910020967.9

(Continued)

(51) Int. Cl.
*H01M 50/209* (2021.01)
*H01M 50/249* (2021.01)
(Continued)

(52) U.S. Cl.
CPC ............. *H01M 50/209* (2021.01); *B60K 1/04* (2013.01); *H01M 50/249* (2021.01);
(Continued)

(58) Field of Classification Search
CPC . H01M 50/209; H01M 50/249; H01M 50/383
See application file for complete search history.

(56) References Cited

U.S. PATENT DOCUMENTS 8,268,469 B2   9/2012  Hermann et al.
9,843,027 B1   12/2017 Spotnitz et al.
(Continued)

FOREIGN PATENT DOCUMENTS

CN  101034753 A  9/2007
CN  101305488 A  11/2008
(Continued)

OTHER PUBLICATIONS

English Translation of International Search Report from PCT/CN2019/092394 dated Oct. 9, 2019 (2 pages).

*Primary Examiner* — Jimmy Vo
(74) *Attorney, Agent, or Firm* — Calfee Halter & Griswold LLP

(57) ABSTRACT

A battery pack, a vehicle, and an energy storage device. The battery pack includes a housing with a first direction and a second direction perpendicular to the first direction. The battery pack housing includes at least one rectangular cell accommodating unit is formed therein. The battery pack also includes a plurality of rectangular cells, and has a dimension greater than or equal to 600 mm along the first direction. The plurality of rectangular cells are arranged in the rectangular (Continued)

cell accommodating unit along the second direction. The rectangular cell has a thickness of D, length of L, and height of H. A length direction of at least one rectangular cell extends from one side of the rectangular cell accommodating unit to its other side along the first direction, and meets: $L>H$, $L>D$, $600 \text{ mm} \leq L \leq 2500 \text{ mm}$, $23 \leq L/D \leq 208$.

18 Claims, 16 Drawing Sheets

(30) Foreign Application Priority Data

| | | |
|---|---|---|
| Jan. 9, 2019 | (CN) | 201910021244.0 |
| Jan. 9, 2019 | (CN) | 201910021246.X |
| Jan. 9, 2019 | (CN) | 201910021247.4 |
| Jan. 9, 2019 | (CN) | 201910021248.9 |

(51) Int. Cl.
    *H01M 50/383*     (2021.01)
    *B60K 1/04*     (2019.01)

(52) U.S. Cl.
    CPC ... *H01M 50/383* (2021.01); *B60K 2001/0405* (2013.01); *H01M 2220/20* (2013.01)

(56) References Cited

U.S. PATENT DOCUMENTS

| | | | |
|---|---|---|---|
| 10,099,546 | B2 | 10/2018 | Hara et al. |
| 2002/0086578 | A1 | 7/2002 | Ikeda |
| 2004/0058233 | A1 | 3/2004 | Hamada et al. |
| 2007/0015049 | A1 | 1/2007 | Hamada et al. |
| 2012/0028105 | A1 | 2/2012 | Kumar et al. |
| 2013/0130070 | A1* | 5/2013 | Adachi ............ H01M 50/35 429/53 |
| 2016/0064781 | A1 | 3/2016 | Specht et al. |
| 2017/0214008 | A9* | 7/2017 | Mardall ............ H01M 10/625 |
| 2017/0237113 | A1 | 8/2017 | Ruehle et al. |
| 2018/0194235 | A1 | 7/2018 | Kim et al. |
| 2018/0287213 | A1 | 10/2018 | Sato et al. |
| 2019/0044114 | A1* | 2/2019 | DeMar ............ H01M 6/42 |

FOREIGN PATENT DOCUMENTS

| | | |
|---|---|---|
| CN | 201146206 Y | 11/2008 |
| CN | 201766132 U | 3/2011 |
| CN | 202210539 U | 5/2012 |
| CN | 102893426 A | 1/2013 |
| CN | 202712297 U | 1/2013 |
| CN | 103928642 A | 7/2014 |
| CN | 104576999 A | 4/2015 |
| CN | 104795527 A | 7/2015 |
| CN | 105762316 A | 7/2016 |
| CN | 205621793 U | 10/2016 |
| CN | 106257714 A | 12/2016 |
| CN | 106450089 A | 2/2017 |
| CN | 106575728 A | 4/2017 |
| CN | 106605314 A | 4/2017 |
| CN | 206259400 U | 6/2017 |
| CN | 106953039 A | 7/2017 |
| CN | 107123769 A | 9/2017 |
| CN | 107394279 A | 11/2017 |
| CN | 107437594 A | 12/2017 |
| CN | 107611296 A | 1/2018 |
| CN | 107644962 A | 1/2018 |
| CN | 206864505 U | 1/2018 |
| CN | 107785511 A | 3/2018 |
| CN | 107925028 A | 4/2018 |
| CN | 207381449 U | 5/2018 |
| CN | 108370075 A | 8/2018 |
| CN | 207743294 U | 8/2018 |
| CN | 108493384 A | 9/2018 |
| CN | 108598354 A | 9/2018 |
| CN | 207967123 U | 10/2018 |
| CN | 208014765 U | 10/2018 |
| CN | 208014778 U | 10/2018 |
| CN | 108933203 A | 12/2018 |
| CN | 108933296 A | 12/2018 |
| CN | 108963184 A | 12/2018 |
| CN | 110165115 A | 8/2019 |
| CN | 110165117 A | 8/2019 |
| DE | 10328209 A1 | 1/2005 |
| DE | 102017209342 A1 | 12/2018 |
| EP | 3386001 A1 | 10/2018 |
| JP | H09274899 A | 10/1997 |
| KR | 20160076156 A | 6/2016 |
| TW | 200840170 A | 10/2008 |
| WO | 2018125641 A1 | 7/2018 |

* cited by examiner

BATTERY PACK, VEHICLE AND ENERGY STORAGE DEVICE

CROSS-REFERENCE TO RELATED APPLICATIONS

This application is the National State of International Application No. PCT/CN2019/092394, filed on Jun. 21, 2019, which claims priority to Chinese Patent Application Serial Nos. "201910021244.0", "201910020967.9", "201910021246.X", "201910021248.9", "201910021247.4", and "201910020925.5", filed by BYD Company Limited on Jan. 9, 2019. The entire content of the above-referenced applications is incorporated herein by reference.

FIELD

This application relates to the technical field of vehicle manufacturing, and in particular, to a battery pack, a vehicle having the battery pack, and an energy storage device having the battery pack.

BACKGROUND

In the related art, for example, a power battery pack applied to an electric vehicle mainly includes a pack body and a plurality of battery modules mounted in the pack body. Each battery module is assembled by a plurality of cells.

As users have increasingly high requirements for the battery life of the electric vehicle, a power battery pack by using existing technologies have a low space utilization of an internal space in a case of a limited bottom space of the vehicle. In addition, energy density of the power battery pack cannot meet the demand, gradually becoming an important factor restricting the development of the electric vehicle.

SUMMARY

In the foregoing prior art, as shown in FIG. 1, a pack body of a power battery pack is mostly divided into mounting areas of a plurality of battery modules 400a by a transverse beam 500 and a longitudinal beam 600; the battery module 400a being fixed to the transverse beam 500 or the longitudinal beam 600 by screws or the like. The battery module 400a includes a plurality of cells arranged in sequence, the plurality of cells being arranged to form a cell array, and an end beam and/or side beam being disposed outside the cell array. Generally, the end beam and the side beam are included and are fixed to define a space for accommodating the cell array. In this case, the end beam and the side beam are connected by screws or connected by other connecting members such as a tie rod, so that the cell array is fixed, and a battery module 400a is constituted.

It is found through experiments and analysis that the battery module 400a is fixed to the transverse beam 500 or the longitudinal beam 600 by screws and other structures, which wastes space, increases weight because of addition of screws and other connecting members, and reduces energy density. In addition, the battery module 400a is designed through fitting of the end beam and the side beam. The end beam and the side beam have certain thicknesses and certain heights, wasting the space inside the pack body and reducing the volume utilization of the pack body. Generally, for the power battery pack in the foregoing prior art, a ratio of a sum of volumes of cells in the pack body to a volume of the pack body is about 40% or even lower.

By using the power battery pack provided by the embodiments in the foregoing prior art, the end beam and the side beam of the battery module 400a and the connection method and mounting method thereof inside the power battery pack, etc. reduce the utilization of space inside the pack body 200. Accordingly, in the power battery pack, a ratio of the sum of volumes of the cells to the volume of the pack body 200 is excessively low, and energy density of the pack body cannot meet the foregoing increase in demand. In addition, an assembly process is complex, and assembly procedures are complicated. First, the cells need to be assembled into a battery module and then the battery module is mounted in the pack body, increasing manpower, materials, and other costs. In addition, because a plurality of assembly procedures are needed, the defect rate is increased during assembly of the power battery pack. A plurality of assembly procedures increase the possibility that the power battery pack becomes loose and is not mounted firmly, adversely affecting the quality of the power battery pack, and reducing stability and reliability of the power battery pack.

This application is provided based on the discovery and understanding of the following facts and problems through a lot of research and development work by an applicant:

In the related art, as shown in FIG. 1, a battery pack mainly includes a battery pack housing and a plurality of battery modules 400a mounted in the battery pack housing, each battery module 400a including a plurality of cells and a module frame, and the plurality of cells being assembled in the module frame to form a battery module 400a. The plurality of battery modules 400a are arranged and mounted in the battery pack housing to form a battery pack, the battery pack housing including a side frame 200a, and a transverse beam 500 and a longitudinal beam 600 connected in the side frame 200a.

For the battery pack in the related art, because a plurality of cells are first assembled on the module frame to form the battery module 400a and then mounted in the battery pack housing, the module frame occupies a large part of a mounting space in the battery pack housing, reducing utilization efficiency of the mounting space in the pack housing, reducing the number of cells in the battery pack, and affecting battery capacity of the battery pack. In addition, due to unevenness of a shape of the module frame, the module frame is difficult to be closely arranged in the battery pack, reducing the utilization of the mounting space in the battery pack.

In the related art, because the battery pack needs a module frame, so that the number of elements is increased, thereby increasing costs. In addition, in a manufacturing process of the battery pack, because a cell needs to be assembled on the module frame first, and then the module frame is mounted in the battery pack housing, working procedures are increased, increasing the costs.

In the related art, as shown in FIG. 1, the module frame leads to great mass of an entire battery module 400a, and the battery module 400a is supported on a bottom plate, so that high rigidity and strength is required for the bottom plate. Therefore, many transverse beams 500 and longitudinal beams 600 are required to be disposed, occupying the limited space in the battery pack housing.

In order to resolve the foregoing technical problem, this application provides a battery pack, including: a battery pack housing having a first direction and a second direction perpendicular to the first direction; where the battery pack has a dimension greater than or equal to 600 mm along the first direction, and at least one rectangular cell accommodating unit is formed in the battery pack housing; the plurality of rectangular cells are arranged in the rectangular cell accommodating unit along the second direction and extend along the first direction, and one rectangular cell is disposed in each rectangular cell accommodating unit along the first direction; The rectangular cell accommodating unit, the rectangular cell has a thickness of D, a length of L, and a height of H; and a dimension of the battery pack along the second direction is greater than or equal to the length L of the rectangular cell; a length direction of at least one rectangular cell extends from one side of the rectangular cell accommodating unit to the other side of the rectangular cell accommodating unit along the first direction, and meeting: L H, L>D, 600 mm≤L≤2500 mm, 23≤L/D≤208.

The battery pack of this application includes a rectangular cell accommodating unit, a plurality of rectangular cells being arranged in each rectangular cell accommodating unit and extending out of the rectangular cell accommodating unit along the first direction. In this way, during mounting, the rectangular cell may be directly mounted in the rectangular cell accommodating unit, and there is no need to first assemble a number of rectangular cells into a battery module and then mount the battery module in the battery pack, simplifying the mounting procedures and saving costs. In this case, a value of the length L of each rectangular cell is in a range of 600 mm-2500 mm, and L/D is in an interval range of 23-208. The length of the rectangular cell is long and is within the range of L/D, so that an entire heat dissipation area of the rectangular cell is improved. With a greater length L and a smaller thickness D, heat inside the rectangular cell is more easily transferred to an exterior of the rectangular cell, and by using a relationship between L and D, an external surface, that is, a heat dissipation area, of the rectangular cell is enlarged, better help improve the overall heat dissipation effect of the battery pack, and improving safety and use stability of the battery pack.

This application provides a battery pack, where a plurality of cells are directly mounted in a battery pack housing, so that a module frame is eliminated, and therefore the battery pack is also called a module-frame-free battery pack.

Because the plurality of cells are directly mounted in the battery pack housing without the module frame, a mounting space in the battery pack housing is better utilized, and the number of cells mounted in the battery pack housing is increased, improving a battery capacity and the battery life of the battery pack.

In addition, because no module frame is required, the cells may be more closely arranged in the battery pack housing, improving the utilization of the mounting space in the battery pack housing and increasing the number of cells.

Because no module frame is required, the number of elements and assembly procedures are reduced, and costs are reduced.

This application further provides a vehicle including the foregoing battery pack.

This application further provides an energy storage device including the foregoing battery pack.

Compared to the related art, the vehicle and the energy storage device have same advantages as the foregoing battery pack, and descriptions thereof are omitted herein.

Other aspects and advantages of this application will be given in the following description, some of which will become apparent from the following description or may be learned from practices of this application.

BRIEF DESCRIPTION OF THE DRAWINGS

The foregoing and/or additional aspects and advantages of this application will become apparent and comprehensible in the description made with reference to the following accompanying drawings, where.

REFERENCE NUMERAL S

Figure 1:
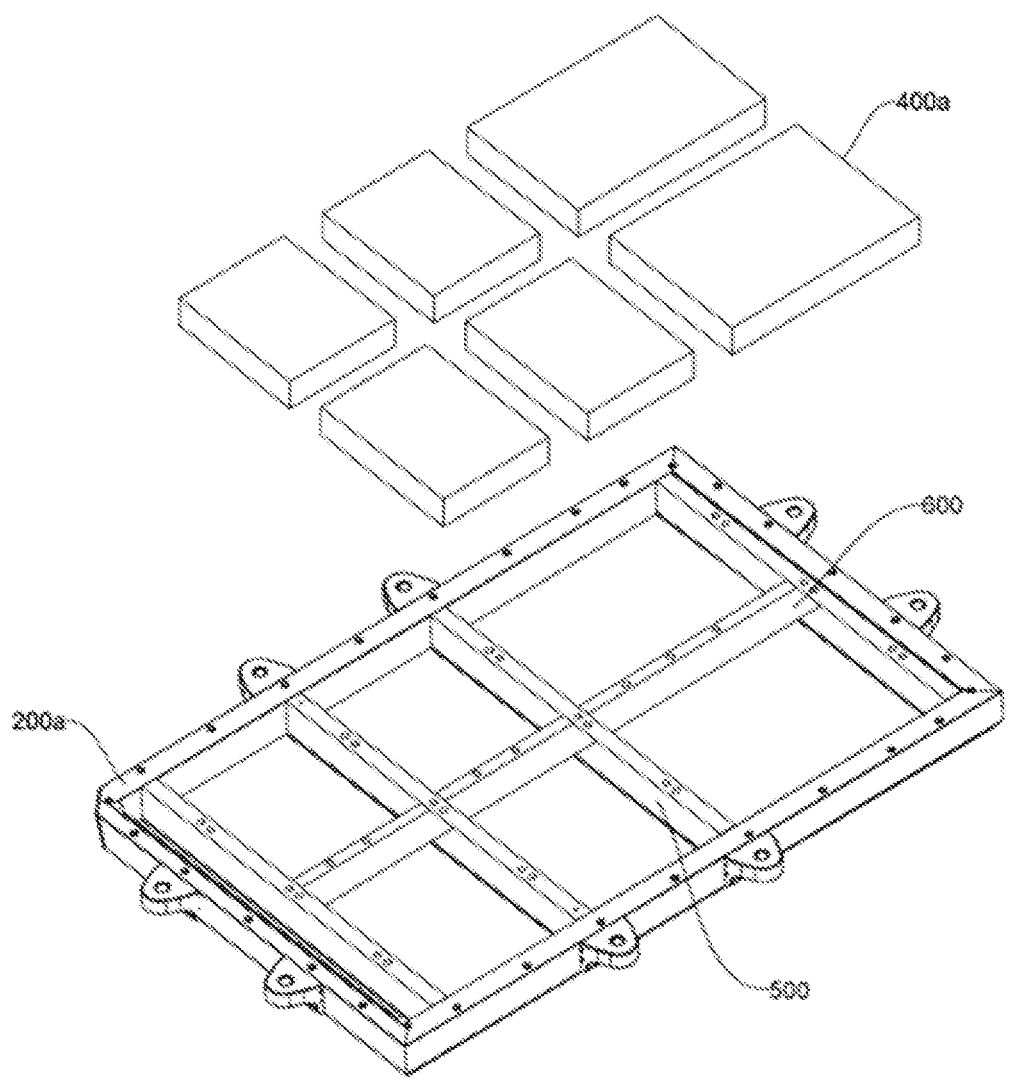
FIG. 1 is a schematic exploded view of a battery pack in the related art.

Vehicle 1, and Energy storage device 2,
Battery pack 10,
Rectangular cell 100, Lead-out terminal 101, Explosion-proof valve 103, and Cell array 400,
Battery pack housing 200, Side frame 200a, First frame 201, Second frame 202, Third frame 203, and Fourth frame 204,
First end plate 207, First connection plate 207b, Via 207c, Second end plate 208, First side plate 209, Side plate body 209a, Second connection plate 209b, Second side plate 210, Bottom plate 211, and Panel 212,
Support plate 213, Support surface 213a, Mounting surface 213b, First connection surface 215, Second connection surface 216, Heat preservation layer 217, Heat-conducting plate 218, Heat exchange plate 219, Sealing cover 220, Exhaust hole 221, Exhaust channel 222, Gas-liquid separator 223, Cooling liquid pipe 224, Cooling liquid inlet 225, Cooling liquid outlet 226, Main liquid inlet pipe 227, Main liquid outlet pipe 228, Main cooling liquid inlet 229, and Main cooling liquid outlet 230,
First side beam 301, First support plate 301a, First support surface 301b, First mounting surface 301c, Second side beam 302, Second support plate 302a, Second support surface 302b, and Second mounting surface 302c,
Cell array 400,
Battery module 400a, Transverse beam 500, and Longitudinal beam 600,
First transverse beam 700, and Second transverse beam 800; and
a length L of a cell, a thickness D of the cell, a height H of the cell, a distance L2 between an inner wall surface of a first frame and an inner wall surface of a second frame, a width L3 of a battery pack housing in a first direction, and a length L4 of the battery pack housing in a second direction.

DETAILED DESCRIPTION

A battery pack 10 of this application may be not only used for a passenger vehicle, but also used for devices that need to use a rectangular cell 100 to provide electric energy for the devices, such as a commercial vehicle, a special vehicle, a ship, backup power sources (dps, ups), an electric bicycle, an electric motorcycle, and an electric scooter, etc. The battery pack 10 of this application may be used as a power battery pack of a means of transport.

The battery pack 10 according to an embodiment of this application is described below with reference to FIG. 2 to FIG. 28.

Unless otherwise specified, in the embodiment of this application, a front-rear direction is a longitudinal direction of a vehicle 1, that is, an X direction; a left-right direction is a lateral direction of the vehicle 1, that is, a Y direction; and an up-down direction is a vertical direction of the vehicle 1, that is, a Z direction.

In actual implementation, when the battery pack 10 is mounted in a finished vehicle, a length direction of the battery pack 10 may be along the X direction, a width direction of the battery pack 10 may be along the Y direction, and a height direction of the battery pack 10 may be along the Z direction. Definitely, for different vehicle models, a method in which the battery pack 10 is mounted may be adjusted to cause the length direction of the battery pack 10 corresponds to the Y direction, and the width direction thereof corresponds to the X direction, or other correspondences are generated.

As shown in FIG. 2 to FIG. 28, the battery pack 10 of this application includes a battery pack housing 200 and a plurality of rectangular cells 100.

The battery pack housing has a first direction, a second direction, and a third direction, the first direction, the second direction, and the third direction being perpendicular to each other. The first direction is parallel to a length direction of the rectangular cell 100, the second direction is parallel to a thickness direction of the rectangular cell 100, and the third direction is parallel to a height direction of the rectangular cell 100. When the rectangular cells 100 are arranged in the battery pack housing in different directions, a correspondence between the first direction, the second direction, and the third direction, and an actual length direction, width direction, and height direction of the battery pack housing needs to be adjusted properly.

A correspondence between the first direction, the second direction, and the third direction, and the X direction, the Y direction, and the Z direction depends on a direction in which the battery pack 10 is mounted and an direction in which the rectangular cells 100 is arranged in the battery pack housing.

In actual implementation, when the battery pack 10 is mounted in a finished vehicle, in embodiments shown in FIG. 17 to FIG. 20, the length direction of the battery pack 10 is parallel to the X direction, a first direction may be parallel to a width direction of the battery pack 10 and a lateral direction of a vehicle 1, a second direction may be parallel to a length direction of the battery pack 10 and a longitudinal direction of the vehicle 1, and a third direction may be parallel to a height direction of the battery pack 10 and a vertical direction of the vehicle 1. In an embodiment shown in FIG. 21, the length direction of the battery pack 10 is parallel to the X direction, the first direction may be parallel to the length direction of the battery pack 10 and the longitudinal direction of the vehicle 1, the second direction may be parallel to the width direction of the battery pack 10 and the lateral direction of the vehicle 1, and the third direction may be parallel to the height direction of the battery pack 10 and the vertical direction of the vehicle 1.

Figure 2:
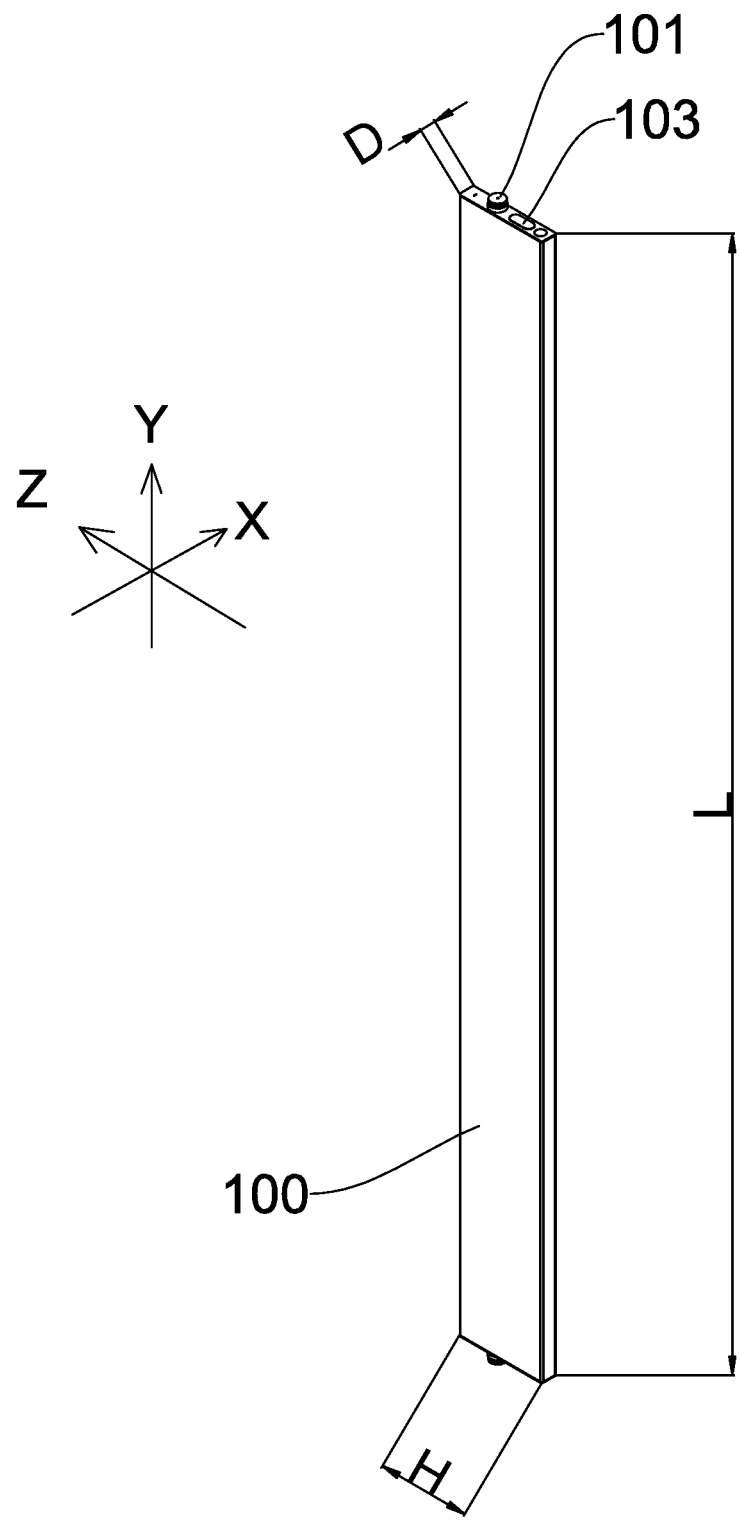
FIG. 2 is a schematic structural three-dimensional view of a cell according to an implementation of this application.

As shown in FIG. 2, at least one rectangular cell 100 includes a housing, a cover plate, a pole core, and a lead-out terminal 101. The pole core is located in a space formed by the housing and the cover plate. The lead-out terminal 101 is connected to the pole core and extends out of the cover plate. In an embodiment shown in FIG. 2, the rectangular cell 100 has two lead-out terminals 101, the two lead-out terminals 101 respectively extending from two cover plates. Definitely, in other embodiments, a plurality of lead-out terminals 101 of the rectangular cell 100 may further extend out on a same cover plate, or more lead-out terminals 101 are disposed for each rectangular cell 100.

In some embodiments of this application, as shown in FIG. 2, the two lead-out terminals 101 at two poles of the rectangular cell 100 are respectively led out from both ends of a length direction of the rectangular cell 100. In other words, the length direction of the rectangular cell 100 may be a current direction inside the rectangular cell 100, that is, the current direction inside the rectangular cell 100 is a first direction. In this way, because the current direction is the same as the length direction of the rectangular cell 100, the rectangular cell 100 has a larger effective heat dissipation area and better heat dissipation efficiency.

As shown in FIG. 2, the rectangular cell 100 has a cuboid structure, and has a length, a thickness, and a height between the length and the thickness. The rectangular cell 100 is placed sideways. The length direction of the rectangular cell 100 is the first direction, the thickness direction thereof is the second direction, and the height direction is the third direction. Two adjacent rectangular cells 100 are arranged in a manner of a big surface facing a big surface.

The rectangular cell 100 has a thickness of D, a length of L, and a height of H.

At least one rectangular cell 100 meets: L>H, L>D, 600 mm≤L≤2500 mm, 23≤L/D≤208.

In other words, the rectangular cell 100 has a length L in the length direction, a thickness D in a thickness direction perpendicular to the length direction, and a height H in a height direction. The height H is between the length L and the thickness D. A dimension of the rectangular cell 100 in this application in the longitudinal direction is much greater than dimensions in the height direction and in the thickness direction.

The rectangular cell 100 has a large surface, a narrow surface, and an end surface. A long side of the large surface has the foregoing length L, and a short side thereof has the foregoing height H. A long side of the narrow surface has the foregoing length L, and the short side thereof has the foregoing thickness D. A long side of the end face has the foregoing height H, and a short side thereof has the foregoing thickness D.

In the related art, it is always one of problems to be resolved in the field of battery technologies that dimensions of the rectangular cell 100 are designed to cause the rectangular cell has both an appropriate battery capacity and a good heat dissipation effect.

In an embodiment provided in this application, a ratio of the length L to the thickness D of the rectangular cell 100 meets 50≤L/D≤70. Under this ratio, a rectangular cell 100 with a greater length and a smaller thickness may be obtained. In this way, when the length of the rectangular cell 100 extends in the first direction, it may be ensured that an appropriate resistance value, a high heat dissipation area, and good heat dissipation efficiency may be maintained, so that the rectangular cell is well adapted to various vehicle models.

In some embodiments, 500 mm≤L≤1000 mm. The rectangular cell 100 of the length has a greater length, and when used in the battery pack 10, only a single rectangular cell 100 needs to be arranged along the first direction.

In some embodiments, the rectangular cell 100 has a volume of V, and at least one rectangular cell 100 meets: 0.0005 mm-2≤L/V≤0.002 mm-2. It is found through extensive experiments that the rectangular cell 100 has a small cross section, and the rectangular cell 100 has a good heat dissipation effect when the rectangular cell 100 meets the foregoing limitations, so that a difference between temperatures of an interior and a periphery of the rectangular cell 100 is small.

In another implementation provided in this application, a ratio of a surface area S of the rectangular cell 100 to a volume V thereof meets 0.1 mm-1≤S/V≤0.35 mm-1, for example, 0.15 mm-1≤S/V≤0.2 mm-1. The ratio may be achieved through the foregoing longer and thinner rectangular cell 100 or through dimension adjustment. By controlling the ratio of the surface area S of the rectangular cell 100 to the volume V thereof, it may be ensured that the surface area of the rectangular cell 100 in the length direction is sufficiently large, and the rectangular cell 100 has a sufficient heat dissipation area to ensure the heat dissipation effect of the rectangular cell 100.

In another implementation provided in this application, a ratio of the surface area S of the rectangular cell 100 to energy E thereof meets S/E≤1000 mm2·Wh-1, such as: 250 mm2·Wh-1≤S/E≤400 mm2·Wh-1. Under this ratio, the longer and thinner rectangular cell 100 may be still obtained. Similarly, the ratio may be achieved through the longer and thinner rectangular cell 100 or achieved through other dimension adjustments. By controlling the ratio of the surface area S of the rectangular cell 100 to the energy E thereof, it may be ensured that when the rectangular cell 100 has certain energy E, the surface area of the rectangular cell may meet heat dissipation requirements thereof.

In some embodiments, the rectangular cell 100 may be a pouch cell. The pouch cell refers to a liquid lithium-ion cell sheathed with a layer of a polymer housing and having a structure wrapped with an aluminum plastic film. When a safety hazard occurs, the pouch cell blows apart without explosion, thereby improving safety performance of the rectangular cell 100. In addition, a pole core of the pouch cell has a large proportion to improve the volume utilization, and the pouch cell has low processing costs.

In another implementation provided in this application, the rectangular cell 100 may be a square cell with a metal housing. It should be noted that when the housing of the rectangular cell 100 is made of a metal material, the metal housing of the rectangular cell 100 has better heat conducting property, improving heat dissipation efficiency of the rectangular cell 100 and optimizing the heat dissipation effect of the rectangular cell. In addition, a hard-case cell has great strength and rigidity and may directly play a role in support through the cell 100 itself to ensure, by replacing a cross-longitudinal beam structure, structural strength of the battery pack, thereby reducing use of a transverse beam 500 and/or a longitudinal beam 600 in the battery pack, and even avoiding use of the transverse beam 500 and/or the longitudinal beam 600 in the battery pack. Therefore, the space occupied by the transverse beam and/or the longitudinal beam in the battery pack is reduced, the space utilization of the battery pack 10 is improved, and more cells 100 can be arranged in the battery pack 10, thereby improving the capacity, voltage, and battery life of the entire battery pack. For example, in an electric vehicle, the design may increase the space utilization from an original utilization about 40% to more than 60% or even higher, such as 80%.

At least one rectangular cell accommodating unit is formed in the battery pack housing 200. For the rectangular cell accommodating unit, a plurality of rectangular cells 100 are arranged in the rectangular cell accommodating unit along a second direction, and a length direction of at least one rectangular cell 100 extends from one side of the rectangular cell accommodating unit to the other side of the rectangular cell accommodating unit along the first direction.

In some embodiments, only one rectangular cell 100 is accommodated in each rectangular cell accommodating unit along the first direction. Only a single rectangular cell 100 is disposed, in combination with the foregoing elongated rectangular cell 100, in each rectangular cell accommodating unit along the first direction to facilitate dense packing of a plurality of rectangular cells 100. The rectangular cell accommodating unit may be used as a restricting container of the rectangular cell 100 to facilitate easy and tight arrangement of the rectangular cell 100.

The rectangular cell 100 may be placed sideways in each cell accommodating unit. Placing sideways of the rectangular cell 100 refers to that two end surfaces of the rectangular cell 100 respectively face two sides of the rectangular cell accommodating unit, and large surfaces of two adjacent rectangular cells 100 face each other, so that the rectangular cell 100 may replace a transverse beam to achieve a better effect and higher strength.

In FIG. 2, FIG. 4, FIG. 12, and FIG. 17 to FIG. 19, a plurality of rectangular cells 100 are arranged in a rectangular cell accommodating unit. The plurality of rectangular cells 100 are arranged in a cell array 400 to be mounted in the rectangular cell accommodating unit. Because no module frame is required, most space inside the rectangular cell accommodating unit may be used to accommodate the rectangular cell 100 itself. More rectangular cells 100 may be mounted in a battery pack housing 200 of the same volume, so that the battery pack 10 has a large battery capacity.

Because no module frame is required, the rectangular cells 100 may be more closely arranged in the rectangular cell accommodating unit. In the embodiments shown in FIG. 2, FIG. 4, FIG. 12, and FIG. 17 to FIG. 19, there is no need to dispose a module frame between a plurality of rectangular cells 100, and two adjacent rectangular cells 100 may have side surfaces with a length*height facing and fitting each other. Arrangement of large surfaces facing each other facilitates close packing, and the cell array 400 formed by a plurality of rectangular cells 100 has overall large rigidity, so that a mounting space utilization of the battery pack housing 200 may be greatly improved, and the number of the rectangular cells 100 may be increased.

The battery pack 10 of this application is a battery pack without a module frame. A plurality of rectangular cells 100 are directly mounted in the battery pack housing 200, omitting the module frame, reducing the number of components and assembly processes, and reducing costs. The number of rectangular cells 100 mounted in the battery pack housing 200 is increased, increasing a battery capacity of the battery pack 10 and improving the battery life.

Figure 3:
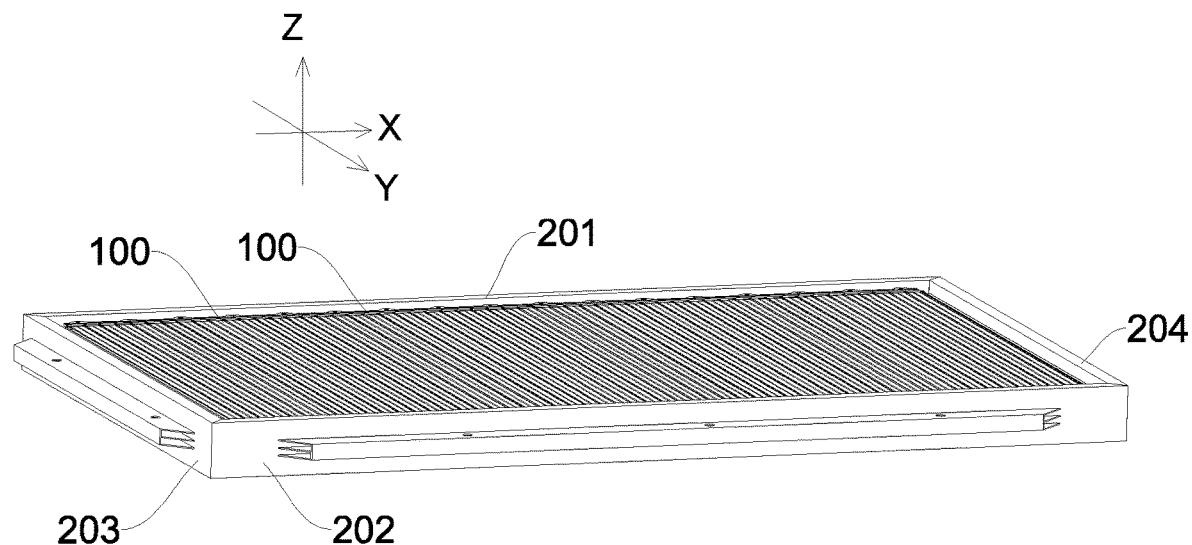
FIG. 3 is a schematic structural three-dimensional view (a sealing cover shown) of a battery pack according to an implementation of this application.
Figure 4:
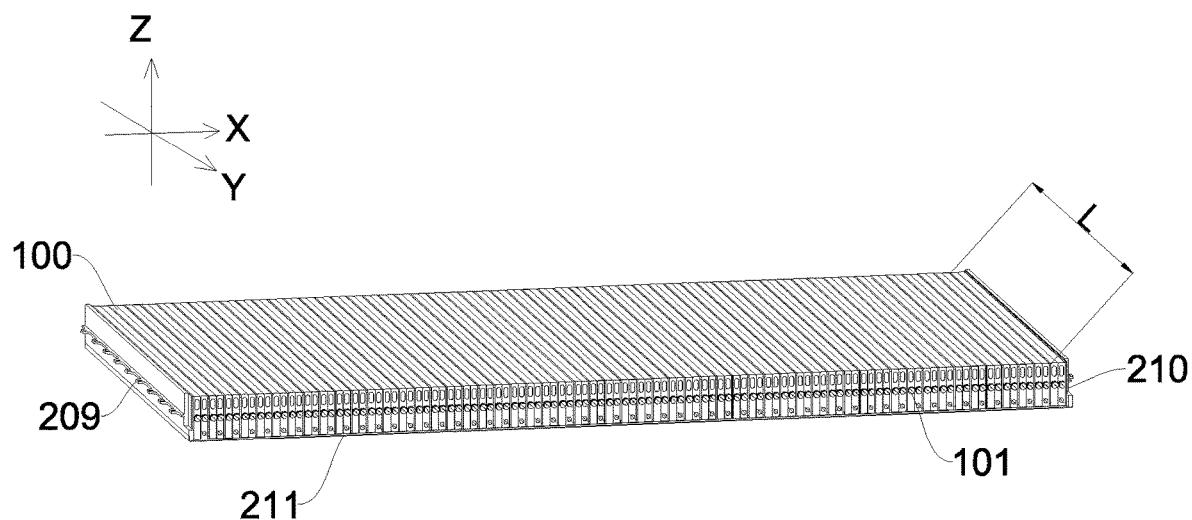
FIG. 4 is a schematic arrangement view of a plurality of cells in a battery pack housing according to an implementation of this application.
Figure 9:
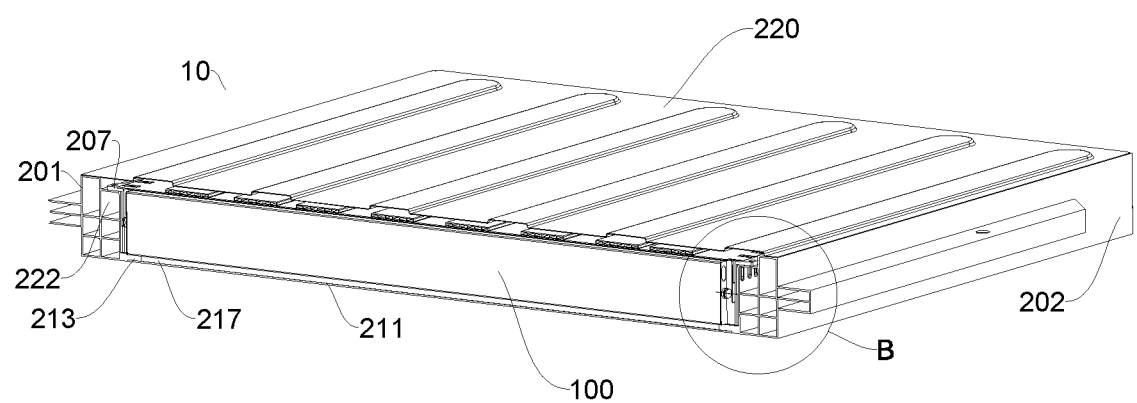
FIG. 9 is a cross-sectional three-dimensional view of a battery pack according to an implementation of this application.
Figure 12:
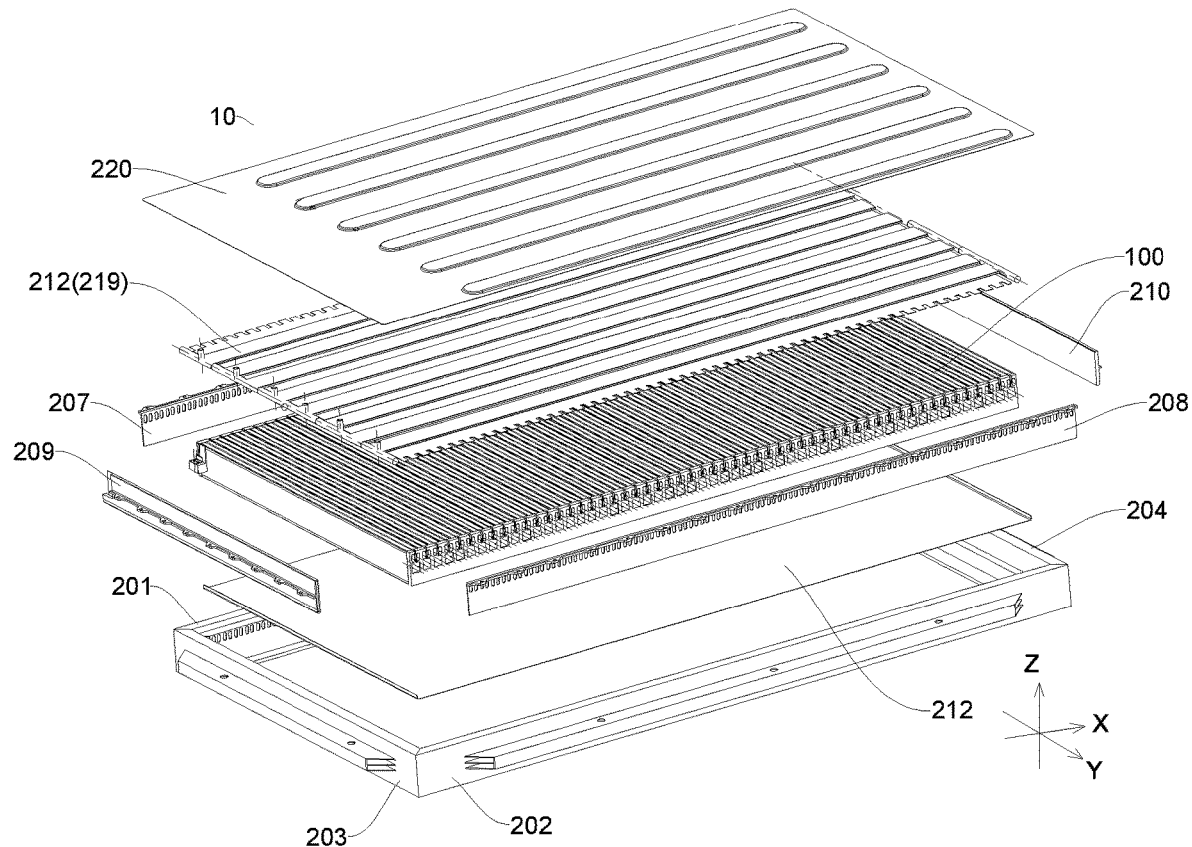
FIG. 12 is an exploded view of a battery pack according to an implementation of this application.

In some embodiments of this application, as shown in FIG. 3, FIG. 9, and FIG. 12, a battery pack housing 200 includes: a bottom housing and a sealing cover connected to the bottom housing to form at least one rectangular cell accommodating unit.

In actual implementation, the bottom housing is a tray. The tray defines a rectangular cell accommodating unit with an open end. The sealing cover 220 is mounted at an open end of the tray, and the sealing cover 220 seals the open end of the rectangular cell accommodating unit to cause the rectangular cell 100 to be basically packaged in the battery pack housing 200, preventing intrusion of water and dust. The sealing cover 220 may be connected to the tray by adhesive. Alternatively, the sealing cover 220 is connected to the tray through a threaded connection member. Alternatively, the sealing cover 220 is connected to the tray by adhesive and the threaded connection member, so that the sealing cover 220 may be firmly connected to the tray through the threaded connection member, and sealing everywhere may be achieved by the adhesive.

It should be noted that, in some embodiments of this application, the battery pack 10 is not a small pack but a large-volume battery pack 10, and the corresponding tray is a vehicle tray.

In the vehicle tray, because a vehicle body has a large width such as 1.2 m-2 m, and has a large length such as 2 m-5 m, for different vehicles models, widths and lengths of corresponding vehicle bodies are different. Due to a larger width and a larger length of the vehicle body, the tray disposed at the bottom of the vehicle body has greater overall dimensions.

For the tray with greater dimensions, in the related art, as shown in FIG. 1, a transverse beam 500 and a longitudinal beam 600 are disposed in a side frame 200*a* of the tray to provide a sufficient support force and structural strength for cells therein. After the transverse beam 500 and the longitudinal beam 600 are added to the vehicle tray, weight and an internal space of the entire vehicle tray are occupied, so that there is fewer space to be effectively used inside the tray. In addition, due to existence of the transverse beam 500, in order to coordinate mounting of the transverse beam 500, a plurality of battery modules 400*a* are disposed in a width direction and a length direction of an interior of the tray. The mounting is complicated, and many mounting structural members are required.

Because the transverse beam and/or the longitudinal beam are disposed in the battery pack housing in the related art, the transverse beam and/or the longitudinal beam occupy a large mounting space for accommodating cells in the battery pack housing, resulting in a low volume utilization of the battery pack housing. Generally, the volume utilization of the battery pack housing is about 40% or even lower. In other words, in the related art, only about 40% of the space in the battery pack housing may be used to mount the cells, resulting in a limited number of cells to be accommodated in the battery pack housing, limiting a capacity and voltage of the entire battery pack, and causing a poor battery life of the battery pack.

However, in this application, the rectangular cell 100 is directly mounted in the battery pack housing 200 to reduce use of the transverse beam and/or the longitudinal beam in the battery pack housing 200, and even no transverse beam and/or longitudinal beam may be used in the battery pack housing 200, reducing the space occupied by the transverse beam and/or the longitudinal beam in the battery pack housing 200, improving the space utilization of the battery pack housing 200, and causing more rectangular cells 100 to be arranged in the battery pack housing 200, thereby improving the capacity, the voltage, and the battery life of the entire battery pack. For example, in an electric vehicle, the design may increase the space utilization from an original utilization about 40% to more than 60% or even higher, such as 80%.

In addition, because there is no need to arrange the transverse beam and/or the longitudinal beams in the battery pack housing 200, on the one hand, a manufacturing process of the battery pack housing 200 is simplified, assembly complexity of the rectangular cell 100 is reduced, and production costs are reduced. On the other hand, weight of the battery pack housing 200 and the entire battery pack is reduced, achieving a lightweight battery pack. In particular, when the battery pack is mounted on an electric vehicle, the battery life of the electric vehicle can be improved, and a lightweight electric vehicle is achieved.

Figure 27:
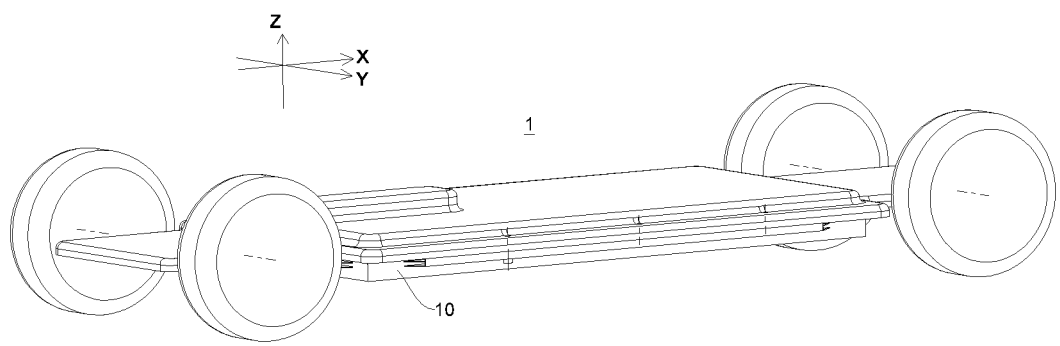
FIG. 27 is a schematic three-dimensional view of a battery pack fixed to a vehicle according to an implementation of this application.
Figure 28:
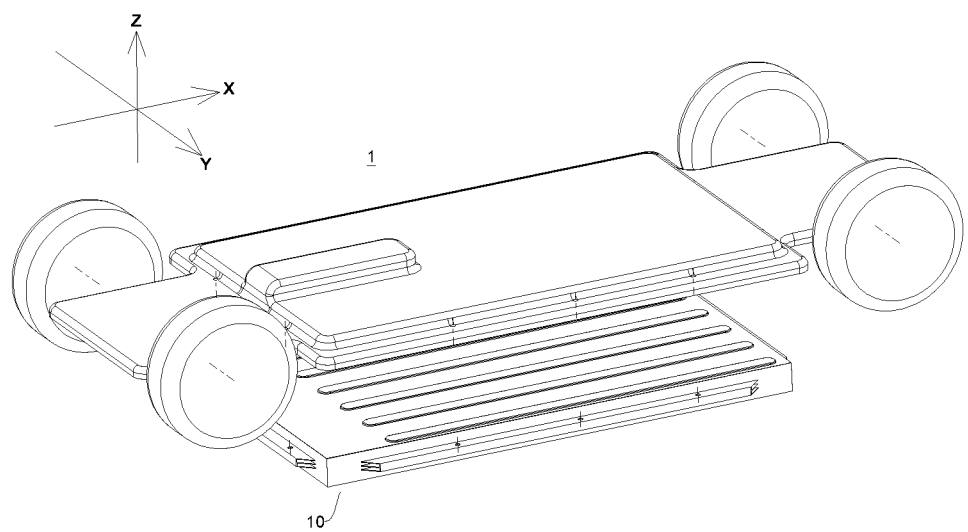
FIG. 28 is a schematic exploded view of a battery pack fixed to a vehicle according to an implementation of this application.
Figure 29:
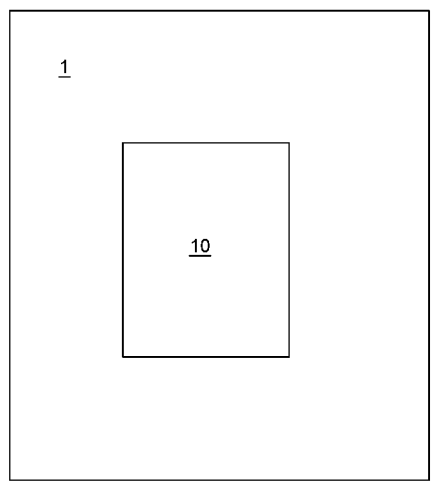
FIG. 29 is a schematic structural view of a vehicle according to an implementation of this application.

In some embodiments, the tray may be a separately-produced vehicle tray for mounting the rectangular cell 100. As shown in FIG. 27 and FIG. 28, when the rectangular cell 100 is mounted on the tray, and an open end of the tray is closed by the sealing cover 220 to form a battery pack 10, the tray may be mounted on the vehicle body through a fastener, for example, a lifting lug may be disposed for the tray to lift the tray to a chassis of a vehicle 1.

Figure 25:
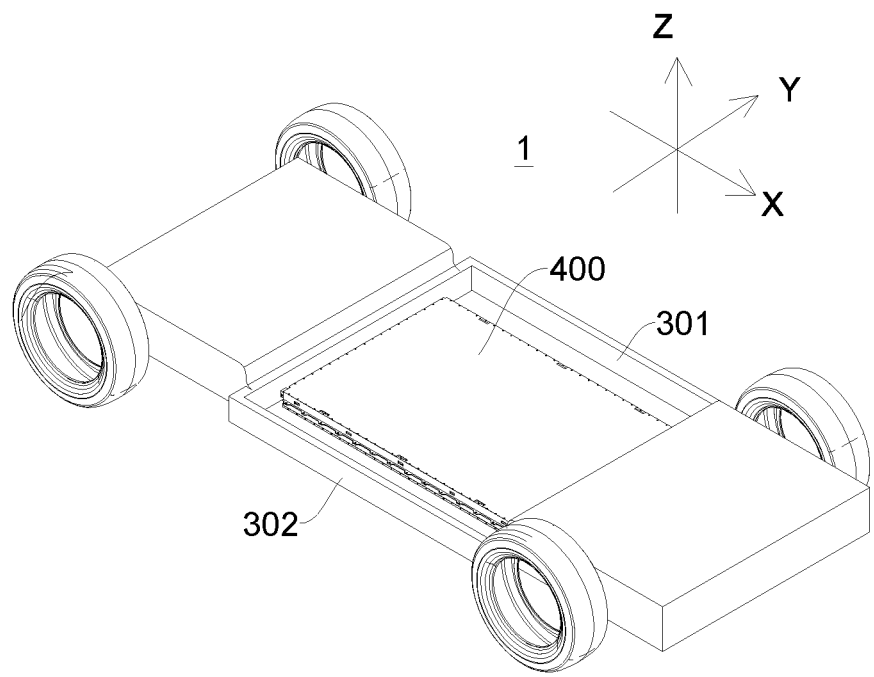
FIG. 25 is a schematic structural three-dimensional view of a battery pack mounted on a vehicle according to an implementation of this application.
Figure 26:
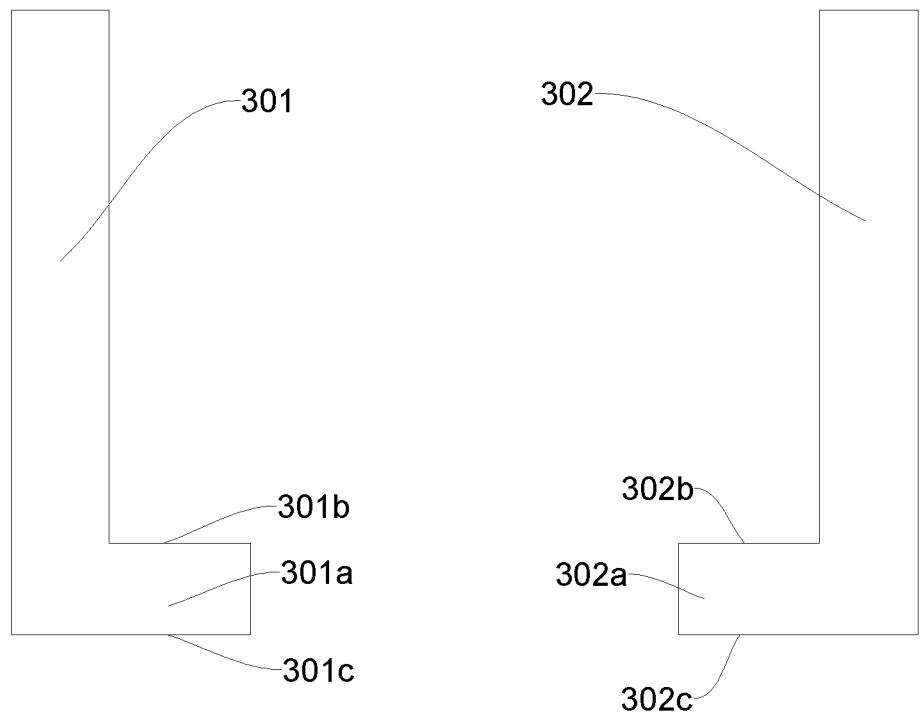
FIG. 26 is a cross-sectional view of a cavity for mounting a battery pack on a vehicle according to an implementation of this application.

In some other embodiments, as shown in FIG. 25 and FIG. 26, the tray may further be integrally formed with the chassis of the vehicle 1. The chassis has a first side beam 301 and a second side beam 302 oppositely disposed along a Y direction. The first side beam 301 and the second side beam 302 are used as a support member for supporting a cell array 400. A first end of the rectangular cell 100 is supported on the first side beam 301, and a second end of the rectangular cell 100 is supported on the second side beam 302.

In actual implementation, the first side beam 301 and the second side beam 302 both extend downward to equivalently form a first frame 201 and the second frame 202 of the tray. The first side beam 301 and the second side beam 302 have a bent (L-shaped) cross section. An inner wall surface of the first beam 301 facing toward the rectangular cell 100 has a protruding first support plate 301a. A first support surface 301b is disposed on a surface of the first support plate 301a facing toward the sealing cover 220, and a first mounting surface 301c surface is disposed on a surface of the first support plate 301a away from the sealing cover 220. An inner wall surface of the second side beam 302 facing toward the rectangular cell 100 has a protruding second support plate 302a. A second support surface 302b is disposed on a surface of the second support plate 302a facing toward the sealing cover 220, and a second mounting surface 302c is disposed on a surface of the second support plate 302a away from the sealing cover 220. The first support surface 301b and the second support surface 302b are configured to support the rectangular cell 100, and the first mounting surface 301c and the second mounting surface 302c are configured to mount a bottom plate 211. In this way, there is no need to manufacture an independent tray, and there is no need to consider assembly of the tray and the finished vehicle.

As shown in FIG. 26, the first support plate 301a of the first side beam 301 and the second support plate 302a of the second side beam 302 are disposed at equal heights in the Z direction, so as to support the rectangular cell 100 in a balanced manner.

As shown in FIG. 26, the first support plate 301a of the first side beam 301 and the second support plate 302a of the second side beam 302 may only extend to positions are disposed at intervals, and the bottom plate 211 needs to be erected below to close a lower end, so that a frame relative to a waste material has a short length, reducing weight of the finished vehicle. Definitely, the first support plate 301a of the first side beam 301 and the second support plate 302a of the second side beam 302 may extend to be connected to each other, so that a cavity with a closed lower end is formed, effectively protecting the rectangular cell 100 below.

In some embodiments of this application, as shown in FIG. 5 to FIG. 10, the tray includes: a side frame 200a and a bottom plate 211. The bottom plate 211 is connected to the side frame 200a to define a rectangular cell accommodating unit. The rectangular cell 100 is connected to the side frame 200a.

In the related art, as shown in FIG. 1, because each cell is supported on the bottom plate, and rigidity and strength of the bottom plate are required to be great. Therefore, many transverse beams 500 and longitudinal beams 600 are to be disposed to enhance the support strength and rigidity of the bottom plate, occupying the limited space in the battery pack housing. However, if the transverse beam 500 and the longitudinal beam 600 are removed, the tray cannot provide sufficient weight capacity.

In this application, the rectangular cell 100 is connected to the side frame 200a to make full use of performance of the side frame 200a having great rigidity and strength. In this way, the bottom plate 211 does not need to bear weight, so that it is possible to remove the transverse beam 500 and the longitudinal beam 600 in the tray, and a released space may be used to arrange more rectangular cells 100.

It should be noted that as shown in FIG. 3 to FIG. 10, the side frame 200a is usually made of a hollow profile. A hollow cavity of the side frame 200a is configured to provide energy absorption for collision. A rib in the hollow cavity of the side frame 200a may enhance the strength of the side frame 200a, a reinforcing rib may further be disposed on an outer side wall of the side frame 200a, and the strength and rigidity of the side frame 200a completely meet requirements for mounting the cell array 400.

In some embodiments, the rectangular cell 100 may be connected to an inner peripheral wall of the side frame 200a. Alternatively, in an embodiment shown in FIG. 10, the rectangular cell 100 is supported on the side frame 200a, fully utilizing the performance of the great rigidity and strength of the side frame 200a.

As shown in FIG. 3 to FIG. 12 and FIG. 15 to FIG. 19, the side frame 200a includes a first frame 201, a second frame 202, a third frame 203, and a fourth frame 204. The first frame 201, the third frame 203, the second frame 202, and the fourth frame 204 are sequentially connected end to end to form a closed loop. The first frame 201 and the second frame 202 are disposed opposite to each other along a first direction, and the third frame 203 and the fourth frame 204 are disposed opposite to each other along a second direction.

The first frame 201, the second frame 202, the third frame 203, and the fourth frame 204 may all be elongated, the first frame 201 and the second frame 202 are disposed at intervals in parallel, the third frame 203 and the fourth frame 204 are disposed at intervals in parallel, and the side frame 200a may be substantially a rectangular frame.

In actual implementation, when a battery pack 10 is mounted to the finished vehicle, the first direction may be a Y direction, and the second direction may be an X direction. Definitely, for different vehicle models, a method in which the battery pack 10 is mounted may be adjusted, so that the first direction corresponds to the X direction, and the second direction corresponds to the Y direction, or other correspondences are generated.

A bottom housing is a tray. The tray includes a first frame 201 and a second frame 202 disposed opposite to each other along the first direction. One end of the rectangular cell 100 is supported on the first frame 201, and the other end thereof is supported on the second frame 202.

Inner wall surfaces of the first frame 201 and the second frame 202 facing toward the rectangular cell accommodating unit each have a support surface 213a. Both ends of the rectangular cell 100 along a length direction thereof are respectively supported on support surfaces 213a of the first frame 201 and the second frame 202. An inner wall surface of the first frame 201 refers to a wall surface of the first frame 201 facing toward the second frame 202. An inner wall surface of the second frame 202 refers to a wall surface of the second frame 202 facing toward the first frame 201.

Each rectangular cell 100 includes a first end and a second end opposite to each other. As shown in FIG. 2, at two ends of the rectangular cell 100 along the length direction (Y direction in the figure) thereof, a first end of each rectangular cell 100 is supported on the first frame 201, and a second end of each rectangular cell 100 is supported on the second frame 202.

In other words, each rectangular cell 100 extends between the first frame 201 and the second frame 202. A plurality of rectangular cells 100 are arranged along the length direction of the first frame 201 and the second frame 202, that is, along the second direction.

Herein, the first end and the second end of the rectangular cell 100 are supported on the first frame 201 and the second frame 202 respectively. The rectangular cell 100 may be directly supported by the first frame 201 and the second frame 202, that is, the rectangular cell is placed on the support surface 213a of the first frame 201 and the second frame 202 respectively, or is fixed on the support surface 213a of the first frame 201 and the second frame 202, such as being pasted on the support surface 213a of the first frame 201 and the second frame 202 in fixing method described in detail below. A specific support method and fixing method are not limited in this application.

Under the technical concept of this application, in an embodiment, along the first direction, a distance between the first frame 201 and the second frame 202 fits dimensions of the rectangular cell 100. The fitting herein means that an interval between inner wall surfaces of the two frames can fit in mounting of one rectangular cell 100. The fitting may be various fitting methods such as interval fitting, interference fitting, fastening fitting, and fixing fitting, etc. to achieve a purpose of this application.

In some embodiments of this application, a first end of each rectangular cell 100 may be directly or indirectly supported on the first frame 201, and the second end of each rectangular cell 100 may be directly or indirectly supported on the second frame 202. The direct support means that the first end of the rectangular cell 100 directly contacts the first frame 201 for support fitting, and the second end of the rectangular cell 100 direct contacts the second frame 202 for support fitting. The indirect support means that, for example, in some embodiments, the first end of the rectangular cell 100 fits and is supported on the first frame 201 through a first end plate 207, and the second end of the rectangular cell 100 fits and is supported on the second frame 202 through a second end plate 208.

It should be noted that the first frame 201 and the second frame 202 are relatively disposed. The first frame 201 and the second frame 202 may be parallel to each other, or may be disposed at an angle, and may be a straight line structure or a curved structure. The rectangular cell 100 may be perpendicular to the first frame 201 and/or the second frame 202, or disposed at an acute angle or an obtuse angle with the first frame 201 and/or the second frame 202. For example, when the first frame 201 and the second frame 202 are parallel to each other, the first frame 201, the second frame 202, and the rectangular cell 100 may form a rectangle, a square, a parallelogram, a circular sector, or other structures. When the first frame 201 and the second frame 202 are at an angle, the first frame 201, the second frame 202, and the rectangular cell 100 may form a trapezoid, a triangle, or other structures. In this application, an angular relationship between the first frame 201 and the second frame 202, and an angular relationship between the rectangular cell 100 and the first frame 201 and the second frame 202 are not limited.

In addition, the "first end" and "second end" of the foregoing rectangular cell 100 are configured to describe an orientation of the rectangular cell 100, and are not configured to define and describe a specific structure of the rectangular cell 100. For example, the first end and the second end are not configured to define and describe a positive pole and a negative pole of the rectangular cell 100. In other words, in this application, one end of the rectangular cell 100 supported on the first frame 201 is the first end, and the other end of the rectangular cell 100 supported on the second frame 202 is the second end.

It should be noted that the first end and second end do not refer to end faces. In actual implementation, two ends of a side surface, such as an end of a narrow surface with a length*width, of the rectangular cell 100, form a support relationship with the support surface 213a of the first frame 201 and the second frame 202.

In some embodiments, the rectangular cell 100 and the side frame 200a may be connected by a pre-connection structure to prevent the rectangular cell 100 without a module frame from shaking in the tray, and to facilitate subsequent mounting of a fixing structure. For example, both ends of the rectangular cell 100 may be pasted to the support surface 213a of the first frame 201 and the second frame 202 rapidly, and may be assembled rapidly along the length direction (second direction) of the support surface 213a once by gluing.

In some embodiments, insulating plates sandwiched between the inner wall surfaces of the first frame 201 and the second frame 202 and the end surface of the rectangular cell 100 to prevent the rectangular cell 100 from being in communication with the frame. A lead-out terminal 101 is disposed at an end (the end along the length direction) of the rectangular cell 100. The first frame 201 and the second frame 202 respectively include inner wall surfaces matching both end surfaces of the rectangular cell 100. Insulating plates are sandwiched between the inner wall surfaces of the first frame 201 and the second frame 202 and the end surface of the rectangular cell 100 respectively. The insulating plates are configured to prevent the lead-out terminal 101 of the rectangular cell 100 from being in communication with the side frame 200a.

As shown in FIG. 5 to FIG. 7, and FIG. 10, an inner wall surface of the first frame 201 facing toward the rectangular cell accommodating unit has an inwardly protruding support plate 213, and an inner wall surface of the second frame 202 facing toward the rectangular cell accommodating unit has an inwardly protruding support plate 213. The support surface 213a is disposed on a surface (an upper surface) of the support plate 213 facing toward the sealing cover 220. A surface (lower surface) of the support plate 213 away from the sealing cover 220 forms a mounting surface 213*b*. The mounting surface 213*b* is configured to mount the bottom plate 211.

Figure 5:
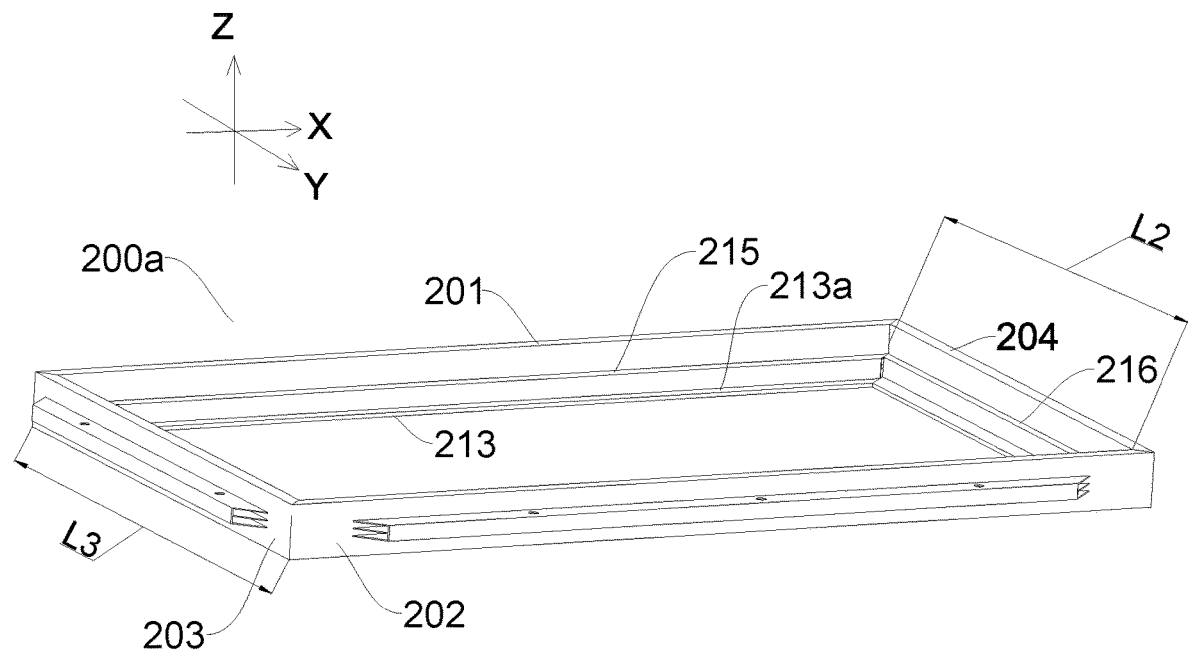
FIG. 5 is a schematic structural three-dimensional view of a side frame according to an implementation of this application.
Figure 6:
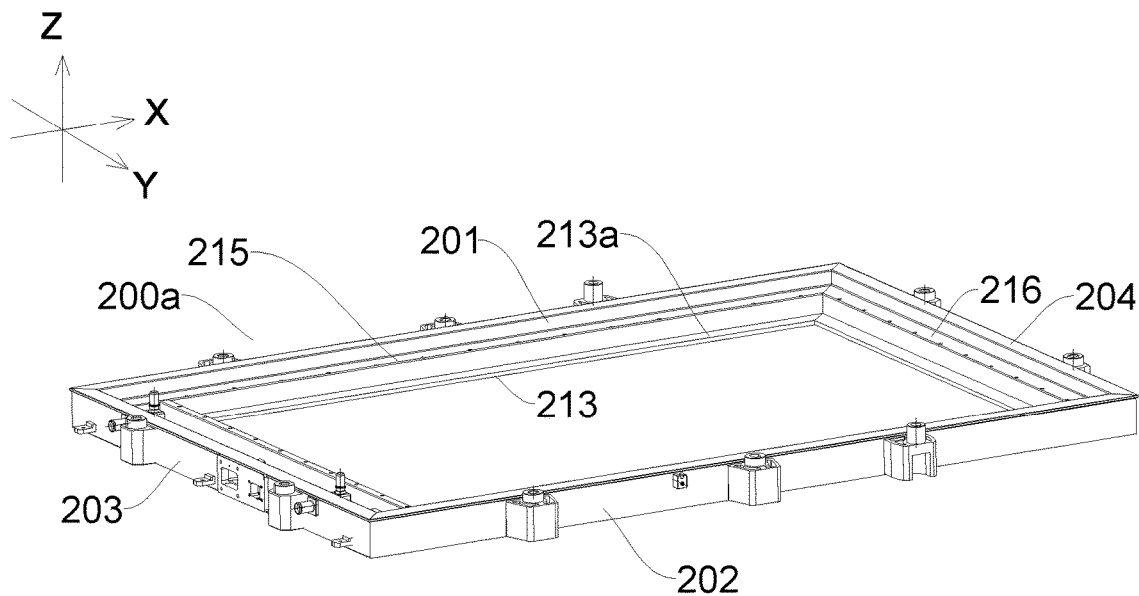
FIG. 6 is a schematic structural three-dimensional view of a side frame according to another implementation of this application.
Figure 7:
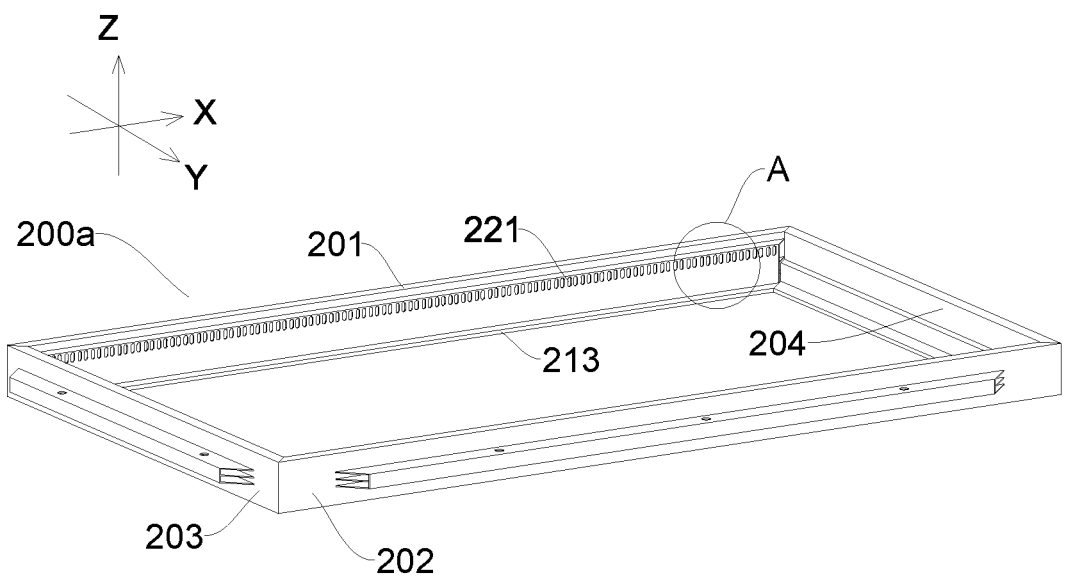
FIG. 7 is a schematic structural three-dimensional view of a side frame according to yet another implementation of this application.

In actual implementation, as shown in FIG. 5 to FIG. 7, the first frame 201, the second frame 202, the third frame 203, and the fourth frame 204 jointly protrude inward to form the support plate 213 at an equal height. In this way, the support plate 213 is equivalent to a closed ring shape, and a mounting surface 213*b* formed on a lower surface of the support plate 213 is also a ring shape, facilitating mounting of the bottom plate 211. The bottom plate 211 may be adhesively connected to the mounting surface 213*b*.

Figure 10:
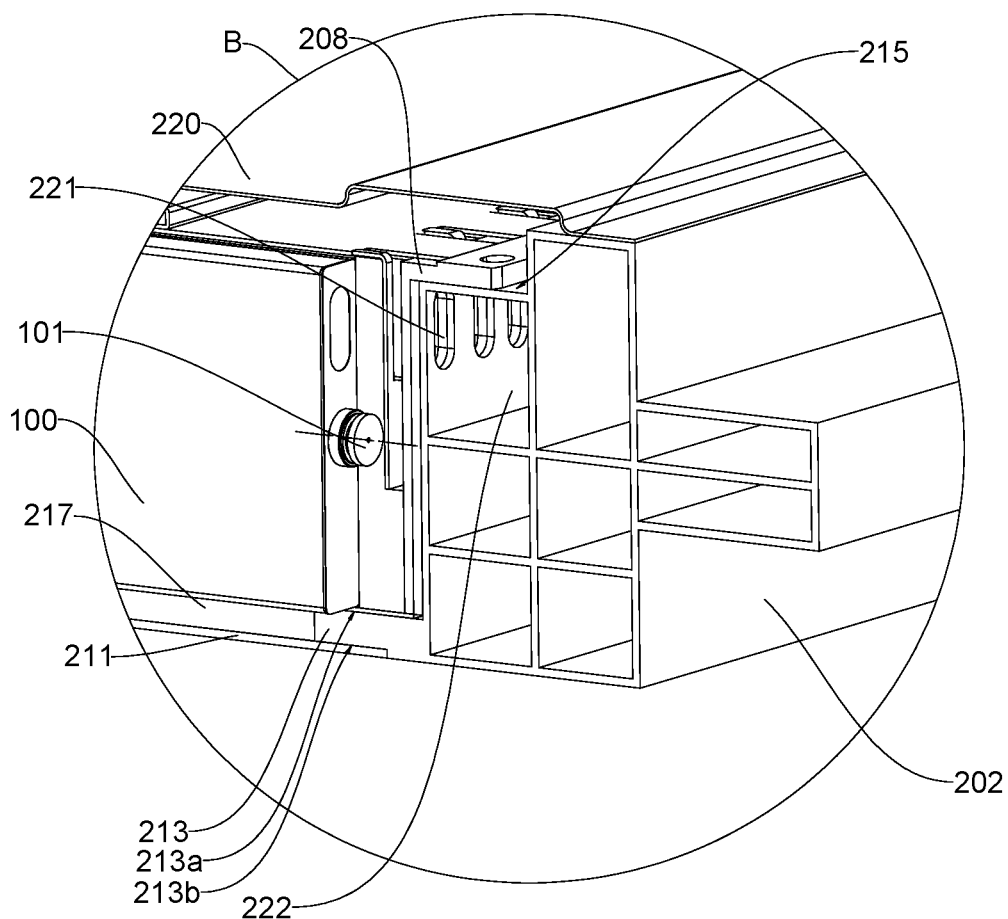
FIG. 10 is a partially enlarged view of a position B in FIG. 9.

As shown in FIG. 10, an inner ring at an end of the side frame 200*a* away from the sealing cover 220 has an annular sink. A bottom wall of the sink forms a mounting surface 213*b*, and the bottom plate 211 is mounted to the sink. In other words, the lower surface of the support plate 213 is recessed upward relative to a lower surface of the side frame 200*a*, so that the bottom plate 211 may be mounted by using an internal space of the side frame 200*a*. For example, in an embodiment shown in FIG. 10, the lower surface of the bottom plate 211 is basically flush with the lower surface of the side frame 200*a*, so that the entire battery pack 10 has a low height.

The rectangular cell 100 is supported on the side frame 200*a*, and the rectangular cell 100 and the bottom plate 211 are disposed at intervals. There is no need for the bottom plate 211 to bear weight of the rectangular cell 100, so that the bottom plate 211 may be thinned. A heat preservation layer 217 is disposed between the rectangular cell 100 and the bottom plate 211 that are disposed at intervals. As shown in FIG. 10, the support plate 213, the rectangular cell 100, and the bottom plate 211 jointly define a heat preservation cavity for accommodating the heat preservation layer 217. The heat preservation layer 217 may have a thickness basically equal to a thickness (along the Z direction) of the support plate 213. The heat preservation layer 217 is configured to isolate heat transfer between the rectangular cell 100 and an exterior to achieve heat preservation of the rectangular cell 100, and prevent thermal interference between an external environment outside an accommodating device and the rectangular cell 100 inside the accommodating device. The heat preservation layer 217 may be made of a material with thermal insulation and heat preservation functions, for example, being made of heat insulation cotton.

As shown in FIG. 5 to FIG. 7, and FIG. 10, both inner wall surfaces of the first frame 201 and the second frame 202 facing toward the rectangular cell accommodating unit have a first connection surface 215. A distance from the first connection surface 215 to the sealing cover 220 is less than a distance from the support surface 213*a* to the sealing cover 220, and the rectangular cell 100 is connected to the first connection surface 215. In other words, the rectangular cell 100 is not supported on the side frame 200*a* only through the support surface 213*a*. By providing the support surface 213*a* and the first connection surface 215, a pressure of the rectangular cell 100 that the side frame 200*a* bears at a single position may be reduced and may be dispersed everywhere, to prevent partial cracking of the side frame 200*a*.

The first connection surface 215 is located radially outward relative to the support surface 213*a*, so that the rectangular cell 100 may be smoothly loaded into the tray from an upper open end.

In actual implementation, as shown in FIG. 5 to FIG. 7, the inner wall surface of the first frame 201 or the second frame 202 facing toward the rectangular cell accommodating unit has at least two steps. Two step surfaces respectively form a first connection surface 215 and a support surface 213*a*. Vertical inner wall surface between the first connection surface 215 and the support surface 213*a* are connected to each other. A multi-step structure is easy to form and may strengthen structural strength of the side frame 200*a*. The rectangular cell 100 is assembled within the limited space. An insulating plate may be disposed between an end surface of the rectangular cell 100 and the vertical inner wall surface between the first connection surface 215 and the support surface 213*a*.

As shown in FIG. 10 and FIG. 12, the battery pack 10 further includes: an end plate disposed at both ends of the rectangular cell 100 along a length direction of the rectangular cell, the rectangular cell 100 being connected to the first connection surface 215 through the end plate. The insulating plate may be integrated with the end plate.

Figure 14:
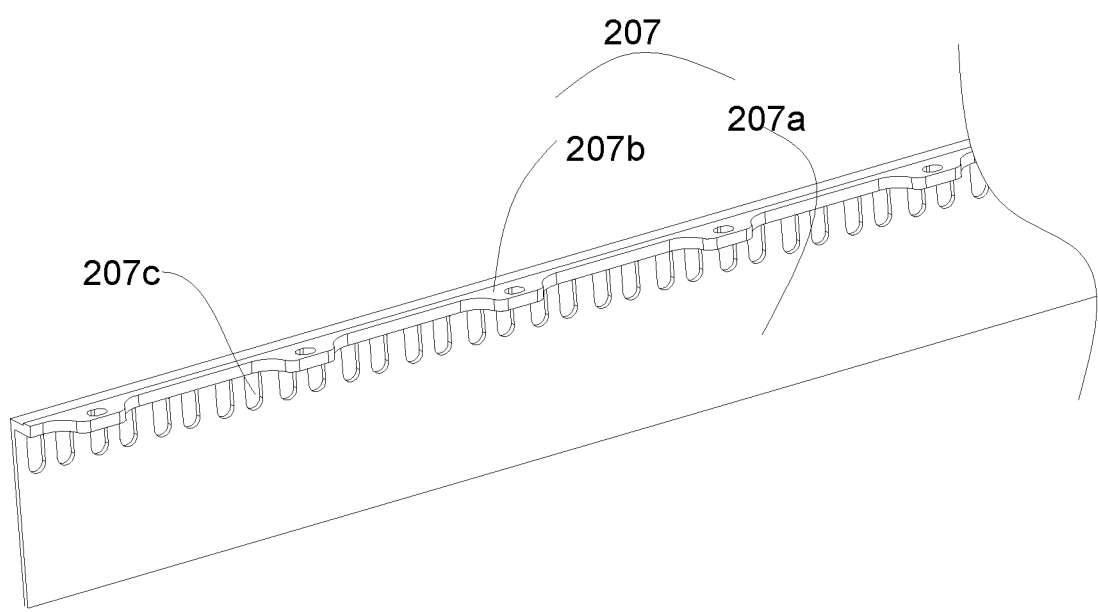
FIG. 14 is a schematic structural three-dimensional view of an end plate according to an implementation of this application.

As shown in FIG. 14, the end plate includes: an end plate body 207*a* and a first connection plate 207*b*. The end plate body 207*a* is disposed opposite to an end surface of the rectangular cell 100. The first connection plate 207*b* is connected to the end plate body 207*a* and protrudes toward a first connection surface 215 (side frame 200*a*). The first connection plate 207*b* is connected to the first connection surface 215, and the first connection plate 207*b* and the end plate body 207*a* may form a bent shape, such as an L shape. Definitely, for a multi-layer battery pack 10 shown in FIG. 16, a first connection plate 207*b* and an end plate body 207*a* may be form a T shape.

For convenience of description, an end plate disposed at a first end of the rectangular cell 100 is defined as a first end plate 207, and an end plate disposed at a second end of the rectangular cell 100 is defined as a second end plate 208. Structures of the first end plate 207 and the second end plate 208 may be the same. The first end of the rectangular cell 100 is supported on the first frame 201 through the first end plate 207, and the second end of the rectangular cell 100 is supported on the second frame 202 through the second end plate 208. The first end plate 207, the second end plate 208, and the rectangular cell 100 form a cell array 400.

In this way, the end plate body 207*a* of the first end plate 207 is sandwiched between a first end surface of the rectangular cell 100 and the first frame 201, and the first connection plate 207*b* of the first end plate 207 is supported on the first connection surface 215 of the first frame 201 and is connected to the first connection surface 215 of the first frame 201. An end plate body of the second end plate 208 is sandwiched between the second end surface of the rectangular cell 100 and the second frame 202, and a first connection plate of the second end plate 208 is supported on the first connection surface 215 of the second frame 202 and is connected to the first connection surface 215 of the second frame 202.

In actual implementation, as shown in FIG. 14, a plurality of mounting holes are disposed on a first connection plate 207*b* and are disposed at intervals along a second direction. A position of the first connection plate 207*b* at which the mounting hole is disposed may be widened compared to other regions. The first connection plate 207*b* may be connected to the first connection surface 215 through a threaded connection member.

A single cell array 400 may have one first end plate 207 and one second end plate 208. Definitely, a plurality of first end plates 207 or second end plates 208 may further be disposed.

Figure 8:
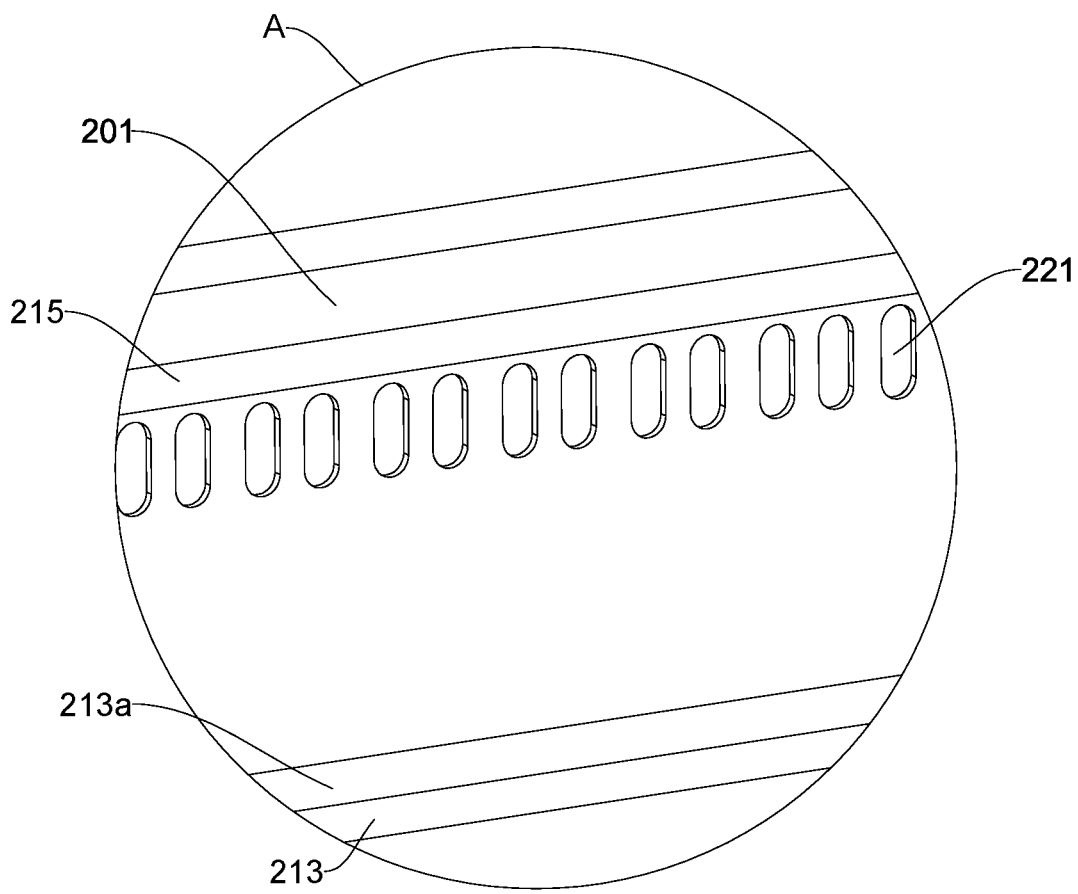
FIG. 8 is a partially enlarged view of a position A in FIG. 7.

As shown in FIG. 8 and FIG. 10, an explosion-proof valve 103 is disposed on at least one of two end surfaces of the rectangular cell 100, a via 207*c* corresponding to the explosion-proof valve 103 is disposed on an end plate body 207a of at least one of two end plates (a first end plate 207 and a second end plate 208), and an exhaust hole 221 corresponding to the via 207c and an exhaust channel 222 in communication with the exhaust hole 221 are disposed on at least one of the first frame 201 and the second frame 202.

In an implementation, an explosion-proof valve 103 is disposed at a first end of the rectangular cell 100 toward the first frame 201, and an exhaust channel 222 is disposed inside the first frame 201. The exhaust channel 222 may be naturally formed inside a cavity-type first frame 201. The via 207c is disposed at a position corresponding to the explosion-proof valve 103 of each rectangular cell 100 on the first end plate 207. The exhaust hole 221 is disposed at a position corresponding to the explosion-proof valve 103 of the rectangular cell 100 on the first frame 201. The exhaust hole 221 is in communication with the exhaust channel 222. An exhaust port in communication with the exhaust channel 222 is disposed on the battery pack housing 200. In addition/Alternatively, the explosion-proof valve 103 is disposed at a second end of the rectangular cell 100 facing toward the second frame 202. The exhaust channel 222 is disposed inside the second frame 202. The via 207c is disposed at a corresponding position of the explosion-proof valve 103 of each rectangular cell 100 on the second end plate 208. The exhaust hole 221 is disposed at a corresponding position of the explosion-proof valve 103 of each rectangular cell 100 on the second frame 202. The exhaust hole 221 is in communication with the exhaust channel 222. An exhaust port in communication with the exhaust channel 222 is disposed on the battery pack housing 200. In other implementations, the explosion-proof valves 103 are disposed at both ends of the rectangular cell 100. Correspondingly, the vias 207c are disposed on the first end plate 207 and the second end plate 208. The exhaust holes 221 and the exhaust channels 222 are disposed on the first frame 201 and the second frame 202 respectively.

In the related art, during use of the rectangular cell 100, if the internal gas pressure inside the rectangular cell is increased to a certain degree, the explosion-proof valve 103 is opened, and flame, smoke, or gas inside the rectangular cell 100 is exhausted through the explosion-proof valve 103. The flame, smoke, or gas gathers inside the battery pack 10 and causes a secondary damage to the rectangular cell 100 if not exhausted in time. However, in this application, because the exhaust holes 221 corresponding to the explosion-proof valves 103 of the rectangular cell 100 are disposed on the first frame 201 and/or the second frame 202, and the exhaust channels 222 are disposed inside the first frame 201 and/or the second frame 202, when a pressure inside the rectangular cell 100 is increased, an explosion-proof valve 103 of the rectangular cell is opened, and flame, smoke, or gas inside the rectangular cell directly enters the exhaust channels 222 in the first frame 201 and/or the second frame 202 through air inlets, and are exhausted out of the first frame 201 and/or the second frame 202 through the exhaust holes 221, for example, into the atmosphere through the exhaust port. In this way, the flame, smoke or gas do not gather inside an accommodating device, to prevent the flame, smoke or gas from causing the secondary damage to the rectangular cell 100.

Figure 15:
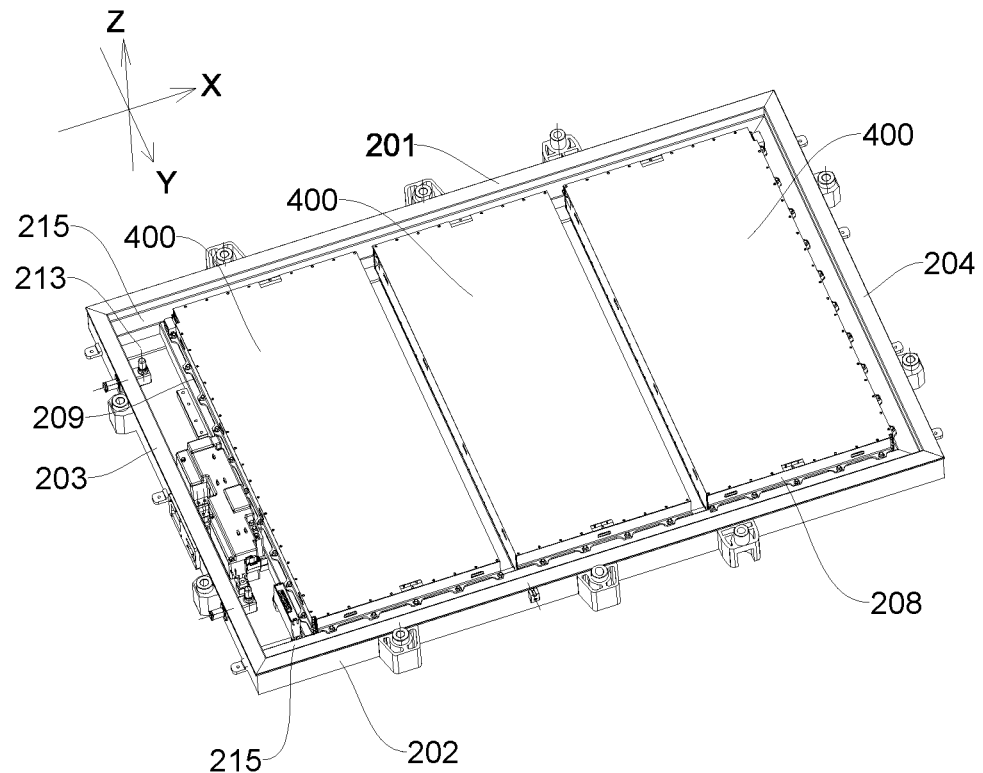
FIG. 15 is a schematic structural three-dimensional view of a battery pack according to an implementation of this application, a cell array including a single layer.

As shown in FIG. 3, FIG. 12, and FIG. 15, a management accommodating cavity for accommodating a battery management component and a power distribution component is defined between the first connection surface 215 and the sealing cover 220. In actual implementation, the first connection plate 207b and the sealing cover 220 are disposed at intervals, and the management accommodating cavity may be defined by the first connection plate 207b, the side frame 200a, and the sealing cover 220. In this way, a circle of management accommodating cavities is formed on a periphery of a cell array 400. The management accommodating cavities may be configured to mount the battery management component and the power distribution component, so that there is no need to design space for mounting the battery management component and the power distribution component, and a gap after mounting of the cell array 400 is utilized to maximize battery density.

In some embodiments, as shown in FIG. 3, a third frame 203 applies a force toward a fourth frame 204 to a rectangular cell 100 disposed adjacent to the third frame 203, and the fourth frame 204 applies a force toward the third frame 203 to a rectangular cell 100 disposed adjacent to the fourth frame 204, so that a plurality of rectangular cells 100 can be closely arranged between the third frame 203 and the fourth frame 204 along a second direction, and the plurality of rectangular cells 100 can be close to each other. In addition, the third frame 203 and the fourth frame 204 may limit the plurality of rectangular cells 100 in the second direction. In particular, when the rectangular cells 100 are slightly expanded, the rectangular cells 100 can be buffered and provided with an inward pressure to prevent the rectangular cells 100 from expanding and deforming excessively. In particular, when an explosion-proof valve 103 and a current interruption device (CID) device are disposed for the rectangular cell 100, the third frame 203 and the fourth frame 204 can effectively limit the expansion of the rectangular cell 100, so that when the rectangular cell 100 has a fault and expands, an interior of the rectangular cell has enough gas pressure to break through the explosion-proof valve 103 or a flip sheet in the current interruption device (CID), thereby causing a short circuit of the rectangular cell 100, ensuring safety of the rectangular cell 100, and preventing the rectangular cell 100 from exploding.

In some embodiments, an elastic device is elastically disposed in at least one position between the third frame 203 and a rectangular cell 100 adjacent to the third frame 203 and between the fourth frame 204 and a rectangular cell 100 adjacent to the fourth frame 204.

A first elastic device may be disposed between the third frame 203 and a rectangular cell 100 adjacent to the third frame 203, and/or a second elastic device may be disposed between the fourth frame 204 and a rectangular cell 100 adjacent to the fourth frame 204. The first elastic device may be mounted on the third frame 203, and the second elastic device may be mounted on the fourth frame 204. A plurality of rectangular cells 100 are closely arranged through the first elastic device and the second elastic device. In this way, the number of the rectangular cells 100 arranged between the third frame 203 and the fourth frame 204 may be adjusted by changing a mounting distance between the first elastic device and the second elastic device, and between the third frame 203 and the fourth frame 204 in a case that an interval between the third frame 203 and the fourth frame 204 is not changed.

In some embodiments, as shown in FIG. 12, the battery pack 10 further includes: a side plate disposed between the third frame 203 and a rectangular cell 100 adjacent to the third frame 203 and between the fourth frame 204 and a rectangular cell 100 adjacent to the fourth frame 204. An elastic device may be integrated with the side plate, and the side plate may be made of rubber.

Figure 13:
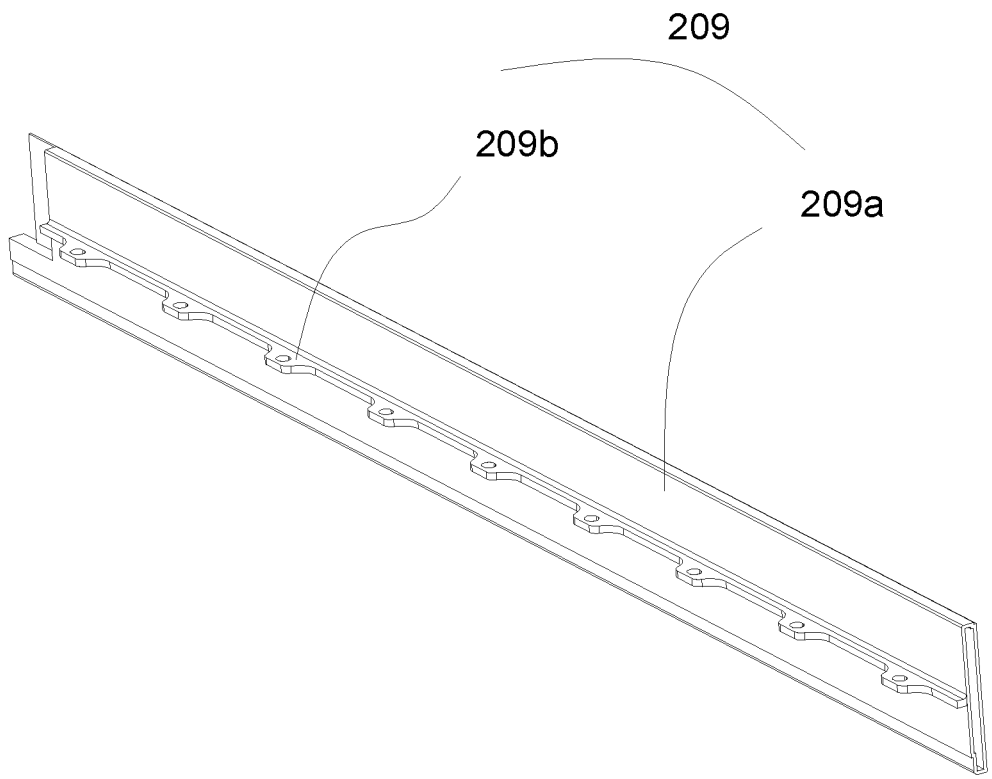
FIG. 13 is a schematic structural three-dimensional view of a side plate according to an implementation of this application.

As shown in FIG. 13, the side plate includes a side plate body 209a and a second connection plate 209b. The side plate body 209a is disposed opposite to a side surface of the rectangular cell 100. The second connection plate 209b is connected to the side plate body 209a and protrudes toward a third frame 203 or a fourth frame 204. A second connection surface 216 facing toward a sealing cover 220 is disposed on the third frame 203 and the fourth frame 204. The second connection plate 209b is connected to the second connection surface 216. The second connection plate 209b and the side plate body 209a may form a bent shape, such as an L shape or a T shape.

For convenience of description, a side plate disposed between the rectangular cell 100 and the third frame 203 is defined as a first side panel 209, and a side plate disposed at a second end of the rectangular cell 100 is defined as a second side plate 210. Structures of the first side plate 209 and the second side plate 210 may be the same. A first end plate 207, a second end plate 208, the first side plate 209, the second side plate 210, and the rectangular cell 100 form a cell array 400. In this way, the end plates or side plates clamp around a plurality of rectangular cells 100, so that the cell array 400 is basically formed as a whole.

In this way, the side plate body 209a of the first side plate 209 is sandwiched between a side surface of the rectangular cell 100 and the third frame 203, and the second connection plate 209b of the first side plate 209 is supported on the second connection surface 216 of the third frame 203 and is connected to the second connection surface 216 of the third frame 203. A side plate body of the second side plate 210 is sandwiched between the side surface of the rectangular cell 100 and the fourth frame 204. A second connection plate of the second side plate 210 is supported on the second connection surface 216 of the fourth frame 204 and is connected to the second connection surface 216 of the fourth frame 204.

As shown in FIG. 12, a panel 212 may be disposed on two surfaces of a rectangular cell 100 along a third direction. An upper end of an end plate and an upper end of a side plate are connected to an upper panel 212, a lower end of the end plate and a lower end of the side plate are connected to a lower panel 212. A first end plate 207, a second end plate 208, a first side plate 209, a second side plate 210, the panel 212, and the rectangular cell 100 form a cell array 400 to cause all six surfaces of the rectangular cell 100 are clamped.

In an implementation, as shown in FIG. 3, a plurality of rectangular cells 100 may be directly mounted in a battery pack housing 200, and a first end and a second end of the rectangular cell 100 may be supported on a first frame 201 and a second frame 202 respectively.

In another implementation, as shown in FIG. 15 to FIG. 19, a plurality of rectangular cells 100 may further be assembled into at least one cell array 400, and then the cell array 400 is mounted in a battery pack housing 200. In this way, based on the technical concept of this application, the technical effect of this application may also be achieved through a fitting relationship between an external structure of the cell array 400 and the first frame 201 and the second frame 202.

In some embodiments, as shown in FIG. 12, the battery pack 10 includes: a panel 212, an end plate, a side plate, a plurality of rectangular cells 100, and battery pack housing 200. A plurality of rectangular cells 100 are arranged side by side. For an arrangement manner of the rectangular cells 100, reference may be made to the description of the foregoing embodiments. An upper surface and a lower surface of the rectangular cell 100 are connected to a panel 212, end plates are disposed on two end surfaces of the rectangular cell 100, and side plates are disposed on outer side surfaces of two outermost rectangular cells 100. Both the end plate and the side plate are connected to two panels 212, an inner wall surface of a side frame 200a of the battery pack housing 200 facing toward a rectangular cell accommodating unit has a support surface 213a and connection surfaces (a first connection surface 215 and a second connection surface 216). Both ends of the rectangular cell 100 are supported on the support surface 213a, and both the end plate and the side plate are connected to the connection surface.

When a plurality of elongated rectangular cells 100 are assembled to the battery pack housing 200, a cell array 400 with a stable structure is not easily formed. The panel 212, the end plate, and the side plate are pressed inward from six surfaces, so that the cell array 400 has relatively stable performance and is easy to assemble.

In some embodiments, a panel 212 is disposed below at least a part of the rectangular cell 100. The panel 212 is connected to a first end plate 207, and the panel 212 is connected to a second end plate 208. The panel 212, the first end plate 207, the second end plate 208, and at least one part of the rectangular cell 100 form the cell array 400. In other words, the panel 212 is disposed below at least one part of a plurality of rectangular cells 100. The panel 212 is connected to the first end plate 207, and the panel 212 is connected to the second end plate 208. The panel 212, the first end plate 207, the second end plate 208, and at least one part of the plurality of rectangular cells 100 form the cell array 400. In other words, there may be one panel 212, and the first end plate 207 and the second end plate 208 are connected to the panel 212, and the first end plate 207, the second end plate 208, and the panel 212 form an accommodating space for accommodating a plurality of rectangular cells 100. During mounting, after the plurality of rectangular cells 100 are arranged in the accommodating space, the first end plate 207 and the second end plate 208 are supported on the first frame 201 and the second frame 202. There may further be a plurality of panels 212 that form a plurality of cell arrays 400 with a plurality of first end plates 207 and second end plates 208, and the plurality of cell arrays 400 are mounted in the battery pack housing 200.

In some embodiments, the panel 212 is disposed above at least one part of the rectangular cell 100. The panel 212 is connected to the first end plate 207, and the panel 212 is connected to the second end plate 208. The upper panel 212, the lower panel 212, the first end plate 207, the second end plate 208, and at least one part of the rectangular cell 100 form a cell array 400. In other words, the panel 212 is disposed above at least one part of the plurality of rectangular cells 100. The panel 212 is connected to the first end plate 207, and the panel 212 is connected to the second end plate 208. The upper panel 212, the lower panel 212, the first end plate 207, the second end plate 208, and at least one part of the plurality of rectangular cells 100 form a cell array 400. In other words, the panel 212 is located on tops of the first end plate 207 and the second end plate 208, the panel 212 is located at bottoms of the first end plate 207 and the second end plate 208, and the rectangular cell 100 is located between one panel 212 and the other panel 212. In this way, the one panel 212 and the other panel 212 may prevent the rectangular cell 100 from moving up and down, increasing stability of the rectangular cell 100.

In some embodiments, the battery pack housing 200 has a third frame 203 and a fourth frame 204 disposed opposite to each other along a second direction different from a first direction. A first side plate 209 is disposed on a side that is of a rectangular cell 100 adjacent to the third frame 203 and that faces toward the third frame 203, and a second side plate 210 is disposed on a side that is of a rectangular cell 100 adjacent to the fourth frame 204 and that faces toward the fourth frame 204. The first end plate 207, the second end plate 208, the first side plate 209, the second side plate 210, the upper panel 212, the lower panel 212, and at least one part of the plurality of rectangular cells 100 form a cell array 400. There may be one or a plurality of cell arrays 400. The first end plate 207, the second end plate 208, the first side plate 209, and the second side plate 210 may be disposed on the panel 212 and around the panel 212. The first end plate 207 is fixed on the first frame 201, the second end plate 208 is fixed on the second frame 202, the first side plate 209 is fixed on the third frame 203, and the second side plate 210 is fixed on the fourth frame 204. The first end plate 207, the second end plate 208, the first side plate 209, the second side plate 210, the upper panel 212, and the lower panel 212 jointly define a closed space for accommodating a plurality of rectangular cells 100. In this way, when there is a failure in the rectangular cell 100, such as a fire and explosion, the first end plate 207, the second end plate 208, the first side plate 209, the second side plate 210, the one panel 212, and the other panel 212 may control the failure of the rectangular cell 100 within a certain range to prevent the rectangular cell 100 from exploding and affecting surrounding components. The first side plate 209 may be the foregoing first elastic buffer plate, and the second side plate 210 may be the foregoing second elastic buffer plate, so that the first side plate 209 and the second side plate 210 has a function of restricting expansion and deformation of a plurality of rectangular cells 100, thereby ensuring start of an explosion-proof valve 103 and/or a current interruption device (CID).

In another implementation, a panel 212 is disposed below at least one part of the rectangular cell 100 in a plurality of rectangular cells 100. The at least one part of the rectangular cell 100 is supported on the first frame 201 and the second frame 202 through the panel 212. The panel 212 and at least one part of the rectangular cell 100 form a cell array 400. In other words, the panel 212 is disposed below at least one part of the plurality of rectangular cells 100. Each rectangular cell 100 is supported on the first frame 201 and the second frame 202 through the panel 212. The panel 212 and at least one part of the rectangular cells 100 form the cell array 400. In the implementation, the plurality of rectangular cells 100 are supported on the first frame 201 and the second frame 202 through the panel 212, simplifying a structure of the cell array 400 and helping achieve a lightweight battery pack 10.

In the related art, because the rectangular cell 100 has smaller dimensions and a smaller length, two opposite ends of the rectangular cell 100 cannot be matched with two side beams oppositely disposed in the battery pack housing 200. Therefore, a transverse beam and/or a longitudinal beam (as shown in the figure) needs to be disposed in the battery pack housing 200, facilitating assembly of the rectangular cell 100. When the rectangular cell 100 is mounted in the battery pack housing 200 through the cell array 400, there is a plurality of rectangular cells 100 along a first direction of the battery pack housing 200. In other words, the rectangular cell 100 does not extend between two opposite side beams (a first frame 201 and a second frame 202, or a first side wall and a second side wall), but extends between two opposite side beams or longitudinal beams. The cell array 400 is fixed to an adjacent transverse beam and/or a longitudinal beam through a fastener.

In this application, as shown in FIG. 2, the rectangular cell 100 has a length of L, a height of H, and a thickness of D, $4 \leq L/H \leq 21$, for example: $4 \leq L/H \leq 20$; $23 \leq L/D \leq 208$, such as $23 \leq L/D \leq 200$. In other words, a dimension in a length direction of the rectangular cell 100 of this application is much greater than a dimension in a height direction and a dimension in a thickness direction thereof. An elongated rectangular cell 100 may extend from the first frame 201 to the second frame 202.

In actual implementation, when the battery pack 10 is used as a battery pack 10 for power supply used in a vehicle 1, a length direction of the rectangular cell 100 may be a width direction of the vehicle 1, that is, a left-right direction of the vehicle 1. In some embodiments, the length L of the rectangular cell 100 meets: 600 mm$\leq$L$\leq$2500 mm, for example 600 mm$\leq$L$\leq$1000 mm, so that the length of the rectangular cell 100 can be adapted to the width of the vehicle 1.

In the embodiments shown in FIG. 2, FIG. 4, FIG. 12, and FIG. 17 to FIG. 19, side surface of a length*a height of two rectangular cells 100 may face and be attached to each other. The rectangular cell 100 has a volume of V and a height of H and meets 0.0001 m-2$\leq$H/V$\leq$0.00015 mm-2.

It may be understood that when V is constant, the smaller the H/V, the greater the L*D. In the foregoing embodiment, the rectangular cell 100 mainly relies on the surface of the length*thickness for heat dissipation. Increase of the L*D value can improve the heat dissipation effect of the rectangular cell 100 to prevent heat accumulation.

In some embodiments, the length direction of the rectangular cell 100 is perpendicular to the first frame 201 and the second frame 202. The cell array 400 formed by the plurality of rectangular cells 100 is arranged in the tray in a plurality of manners. Several embodiments are described below.

In the embodiments shown in FIG. 3 and FIG. 12, a distance between a first end and a second end of the rectangular cell 100 is L, and a distance between an inner wall surface of the first frame 201 and an inner wall surface of the second frame 202 is L2. A ratio of L to L2 meets L/L2$\geq$50%. In other words, along the first direction, only one rectangular cell 100 is arranged between the first frame 201 and the second frame 202. A relationship between the rectangular cell 100 and two frames are arranged in this manner along the first direction, so that the rectangular cell 100 is used as a transverse beam. In an exemplary implementation provided in this application, only one rectangular cell 100 is disposed between the first frame 201 and the second frame 202 along the first direction, so that the rectangular cell 100 itself may be used as a transverse beam for strengthening structural strength of the battery pack housing 200.

In some embodiments, the ratio of L to L2 may meet 80%$\leq$L/L2$\leq$97%, so that the first end and the second end of the rectangular cell 100 are as close as possible to the first frame 201 and the second frame 202 and even abut against the first frame 201 and the second frame 202, facilitating dispersion and conduction of a force through a structure of the rectangular cell 100 itself, ensuring that the rectangular cell 100 may be used as a transverse beam for strengthening the structural strength of the battery pack housing 200, and ensuring that the battery pack housing 200 has sufficient strength to resist deformation by an external force.

In the embodiments shown in FIG. 3 and FIG. 12, one cell array 400 is disposed in the entire tray, so that the rectangular cells 100 may be stacked closely to the greatest extent.

Figure 18:
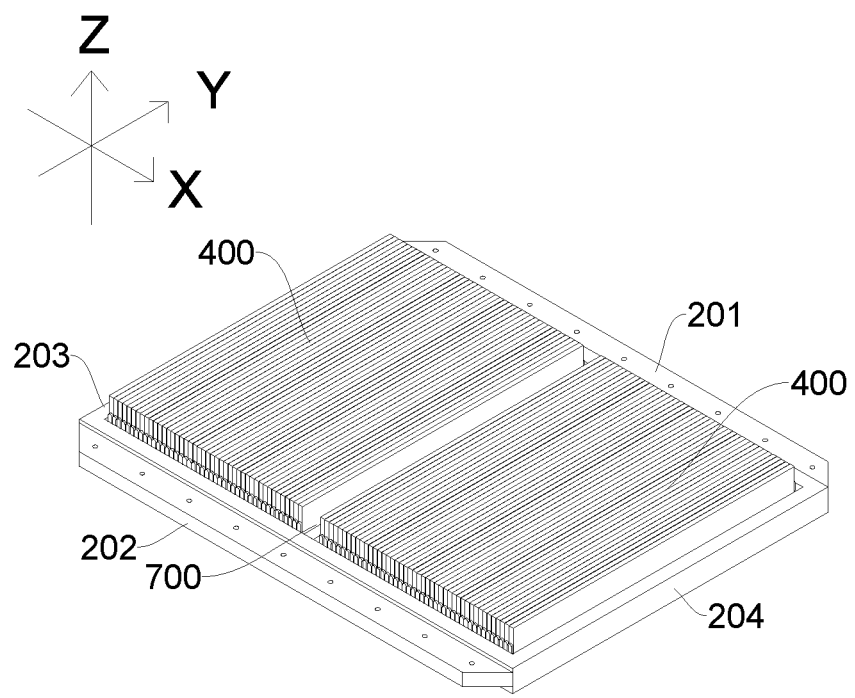
FIG. 18 is a schematic structural three-dimensional view of a battery pack according to yet another implementation of this application, there being a plurality of cell arrays distributed along an X direction.

In some embodiments, as shown in FIG. 18, a first transverse beam 700 is disposed in the battery pack housing 200. The first transverse beam 700 extends along the first direction of the battery pack housing 200. The first transverse beam 700 divides an interior of the battery pack housing 200 into two rectangular cell accommodating units.

In an embodiment shown in FIG. 18, two cell arrays 400 distributed along a second direction are disposed on the entire battery pack housing 200. One cell array 400 is disposed in each rectangular cell accommodating unit, and an interval is reserved between adjacent cell arrays 400. For example, in an embodiment shown in FIG. 15, a battery pack 10 includes three cell arrays 400 distributed along a second direction. For example, in the embodiment shown in FIG. 18, the battery pack 10 includes two cell arrays 400 distributed along the second direction.

It can be understood that when the battery pack 10 has an excessive dimension along the second direction, a plurality of cell arrays 400 is disposed to facilitate assembly, accumulation of errors along the second direction during assembly may be reduced, and a space for expansion is left along the second direction.

In other possible implementations, under the concept of this application, two or more rectangular cells 100 may further be disposed along the first direction to at least fully utilize a space of the battery pack housing 200.

Figure 17:
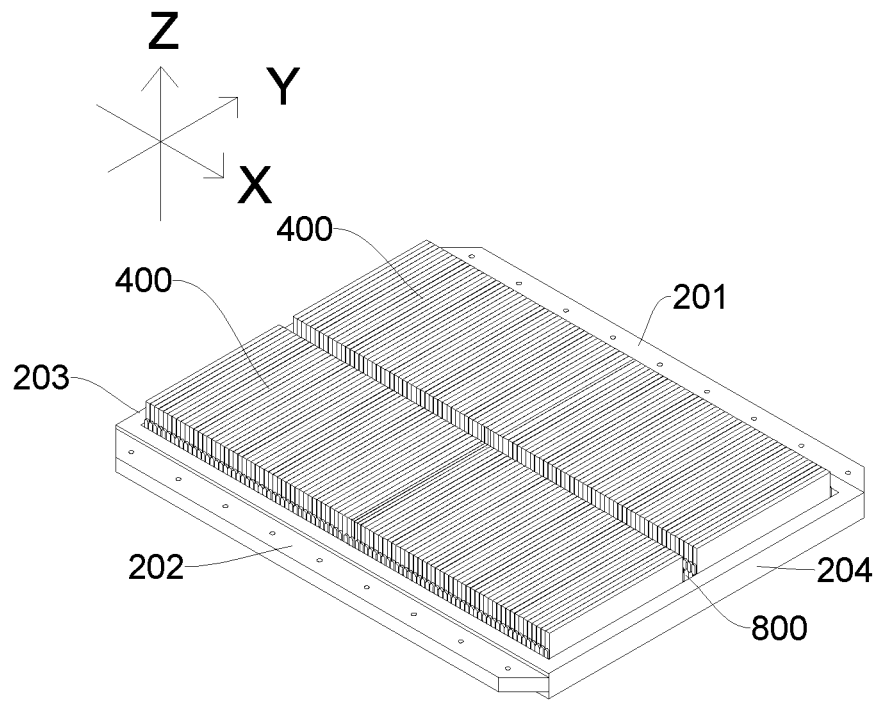
FIG. 17 is a schematic structural three-dimensional view of a battery pack according to yet another implementation of this application, there being a plurality of cell arrays distributed along a Y direction.

In some embodiments, as shown in FIG. 17, a second transverse beam 800 is disposed in the battery pack housing 200, and the second transverse beam 800 extends along the second direction of the battery pack housing 200. The second transverse beam 800 divides an interior of the battery pack housing 200 into two cell accommodating units.

As shown in FIG. 17, two cell arrays 400 distributed along the first direction are disposed on the entire battery pack housing 200. One cell array 400 is disposed in each rectangular cell accommodating unit, and an interval is reserved between two cell arrays 400.

It may be understood that when the battery pack 10 has an excessively great dimension along a first direction, a plurality of cell arrays 400 are disposed to facilitate assembly, an expansion space is left along the first direction, and a length of the rectangular cell 100 may be shortened, facilitating manufacturing of the rectangular cell 100.

Figure 19:
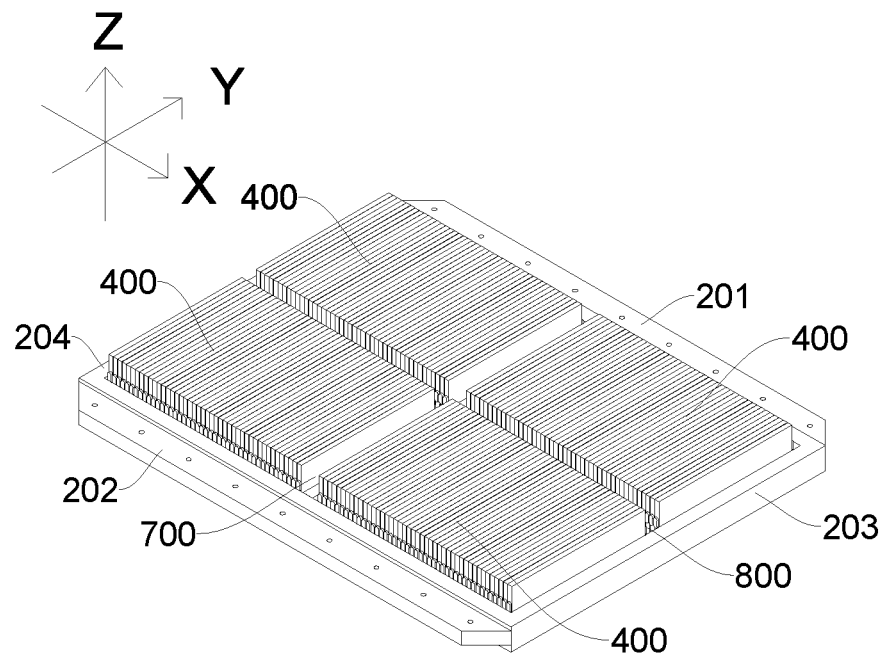
FIG. 19 is a schematic structural three-dimensional view of a battery pack according to yet another implementation of this application, there being a plurality of cell arrays distributed along an X direction and a Y direction.

In some embodiments, as shown in FIG. 19, a first transverse beam 700 and a second transverse beam 800 are disposed in a battery pack housing 200. The first transverse beam 700 extends along a first direction of the battery pack housing 200, and the second beam 800 extends along a second direction of the battery pack housing 200. The first transverse beam 700 and the second transverse beam 800 intersect, and the first transverse beam 700 and the second transverse beam 800 divides an interior of the battery pack housing 200 into four cell accommodating units.

As shown in FIG. 19, two cell arrays 400 distributed along the first direction are disposed on the entire battery pack housing 200, and the entire battery pack housing includes two cell arrays 400 distributed along the second direction. One cell array 400 is disposed in each rectangular cell accommodating unit. In an embodiment shown in FIG. 19, the battery pack 10 includes 4 (2×2) cell arrays 400, so that a length of each rectangular cell 100 may be designed to be relatively not excessively long, facilitating manufacturing of the rectangular cell 100, reducing accumulated errors during assembly along the second direction, and leaving an expansion space along the first direction and the second direction.

Figure 16:
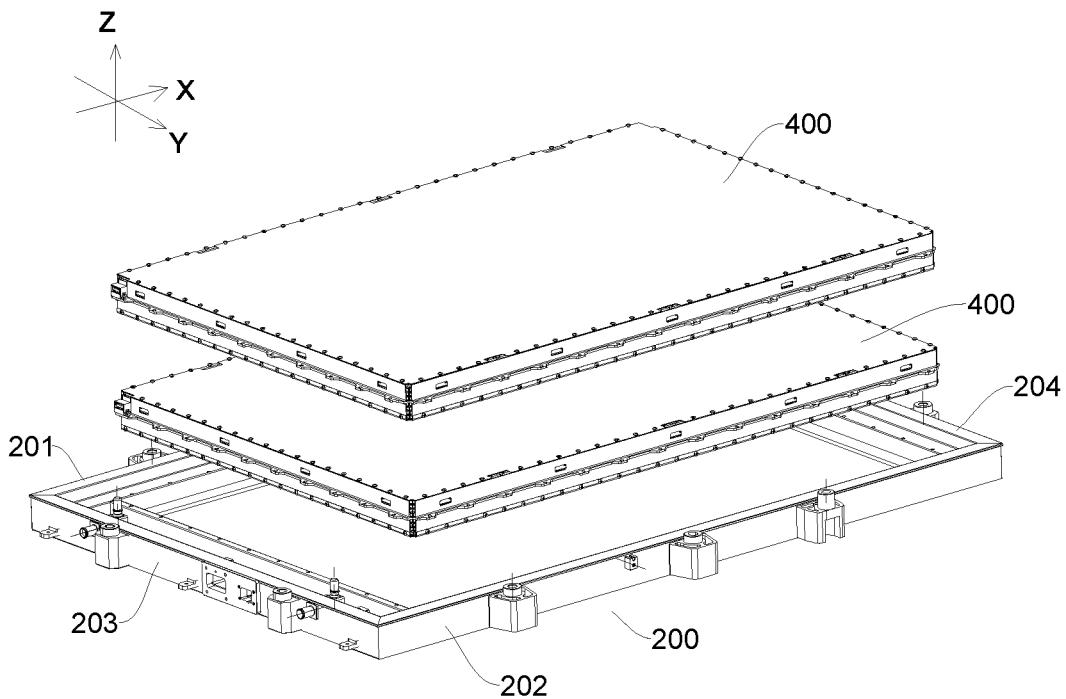
FIG. 16 is a schematic structural three-dimensional view of a battery pack according to another implementation of this application, the cell array including a plurality of layers.

In an embodiment shown in FIG. 16, at least two layers of a plurality of rectangular cells 100 are arranged for a battery pack 10 along a vertical direction (Z direction). In other words, the plurality of rectangular cells 100 are arranged as a plurality of layers stacked along a third direction (the third direction is perpendicular to the first direction and perpendicular to a second direction). A plurality of rectangular cells 100 in each layer are located between the frame 201 and the second frame 202. The number of layers of the rectangular cells 100 may be set according to dimensions of the battery pack housing 200. In this way, a plurality of rectangular cells 100 can be arranged as much as possible in the limited space of the battery pack housing 200 to improve the volume utilization of the battery pack housing 200 and improve the capacity, voltage, and the battery life of the battery pack 10. In this way, when a finished vehicle has a sufficiently high space along the third direction, more rectangular cells 100 may be arranged. In this arrangement way, a dimension of the rectangular cell 100 along a height direction may be shortened to facilitate heat dissipation of the rectangular cell 100.

In the foregoing embodiment, rectangular cells 100 stacked along the third direction may be rectangular cells 100 that have two ends fitting the first frame 201 and the second frame 202, or may be placed directly on top of a next layer of rectangular cells 100 and do not fit, for support, or be connected to the first frame 201 and the second frame 202.

In an implementation provided in this application, the first direction may be perpendicular to the second direction, the first direction is a length direction of each rectangular cell 100, and the second direction is a length direction of the first frame 201 and the second frame 202, that is, a thickness direction of each rectangular cell 100. In other words, the first frame 201 and the second frame 202 are perpendicular to the rectangular cell 100, and both ends of each rectangular cell 100 in the length direction are supported on the first frame 201 and the second frame 202. In this way, when the first frame 201 and/or the second frame 202 are impacted by an external force, a plurality of rectangular cells 100 may conduct and disperse the force to better strength a structure and improve capability of the battery pack housing 200 in resisting deformation by the external force. In this implementation, as shown in FIG. 3, FIG. 5, FIG. 6, FIG. 7, and FIG. 15 to FIG. 19, a first frame 201 and a second frame 202 are linear structures, and a second direction is a linear direction. In some possible implementations, the first frame 201 and the second frame 202 may be curved structures. In this case, the first direction may also be a circumferential direction, and a corresponding second direction is a radial direction.

In some embodiments of this application, the battery pack 10 further includes: a heat exchange plate 219, the heat exchange plate 219 being mounted to an upper surface of a rectangular cell 100.

Figure 11:
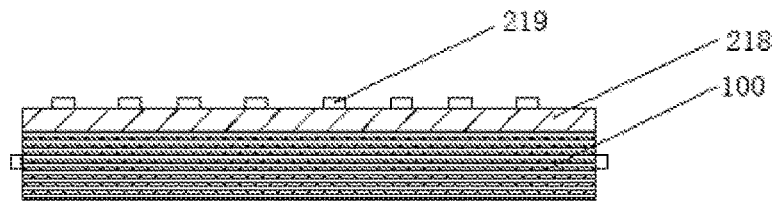
FIG. 11 is a sectional view of a battery pack according to another implementation of this application, a first frame and a second frame being not shown.

For an embodiment in which a cell array 400 includes the heat exchange plate 219, as shown in FIG. 11, a heat-conducting plate 218 may be disposed between the heat exchange plate 219 and the rectangular cell 100 to facilitate heat dissipation of the cell and ensure a little difference in temperatures of a plurality of rectangular cells 100. The heat-conducting plate 218 may be made of a material with good thermal conductivity. For example, the heat-conducting plate 218 may be made of copper or aluminum with high thermal conductivity.

In an implementation, as shown in FIG. 12, for an embodiment in which the cell array 400 includes a panel 212, the heat exchange plate 219 may be integrated with an upper panel 212. The heat exchange plate 219 may be liquid-cooled, and a cooling channel is disposed inside the upper panel 212, and a cooling liquid is disposed inside the cooling channel, so that the temperature of the rectangular cell 100 is reduced through the cooling liquid, causing the rectangular cell 100 to be at a suitable operating temperature. Because the heat exchange plate 218 is disposed for the heat exchange plate 219 and the rectangular cell 100, when the rectangular cell 100 is cooled through the cooling liquid, temperature differences at all positions of the heat exchange plate 219 may be balanced through the heat conducting plate 218, thereby controlling temperature differences between the plurality of rectangular cells 100 to be within 1° C.

In order to improve the cooling effect of the heat exchange plate 219, as shown in FIG. 17 to FIG. 19, a gas-liquid separator 223 may be disposed upstream of the heat exchange plate 219. Because the cooling liquid in the heat exchange plate 219 may come from other thermal management loops of a vehicle, the cooling liquid may be a gas-liquid cooling liquid. After the gas-liquid cooling liquid is separated into gas and liquid by the gas-liquid separator 223, it may be ensured that a pure liquid phase cooling liquid enters the heat exchange plate 219 to cool the rectangular cell 100, ensuring the cooling effect.

Figure 22:
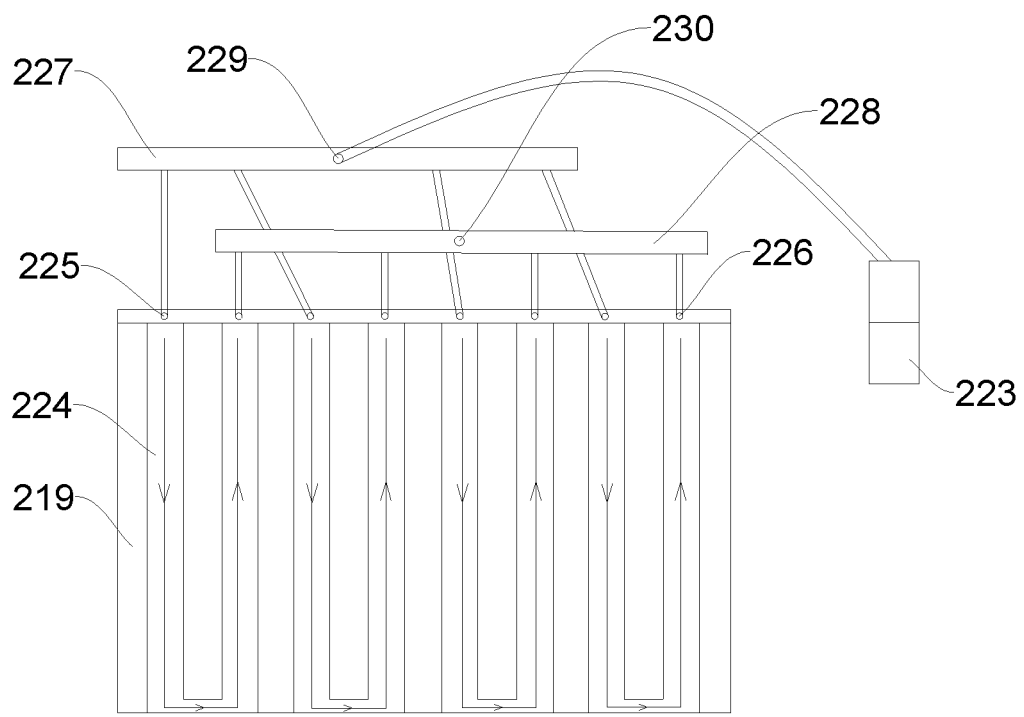
FIG. 22 is a schematic plan view of a liquid cooling plate according to an implementation of this application.

The heat exchange plate 219 may have any suitable structure. In an implementation, as shown in FIG. 22, the heat exchange plate 219 may have a plurality of cooling liquid pipes 224. Each of the plurality of cooling liquid pipes 224 is formed as a U-shaped structure to have a cooling liquid inlet 225 and a cooling liquid outlet 226 located on a same side. The cooling liquid inlets 225 and the cooling liquid outlets 226 of the plurality of cooling liquid pipes 224 are sequentially disposed at intervals along an arrangement direction of the plurality of cooling liquid pipes 224. The battery pack further includes a main liquid inlet pipe 227 and a main liquid outlet pipe 228. Each cooling liquid inlet 225 is in communication with the main liquid inlet pipe 227, and each cooling liquid outlet 226 is in communication with the main liquid outlet pipe 228.

Figure 23:
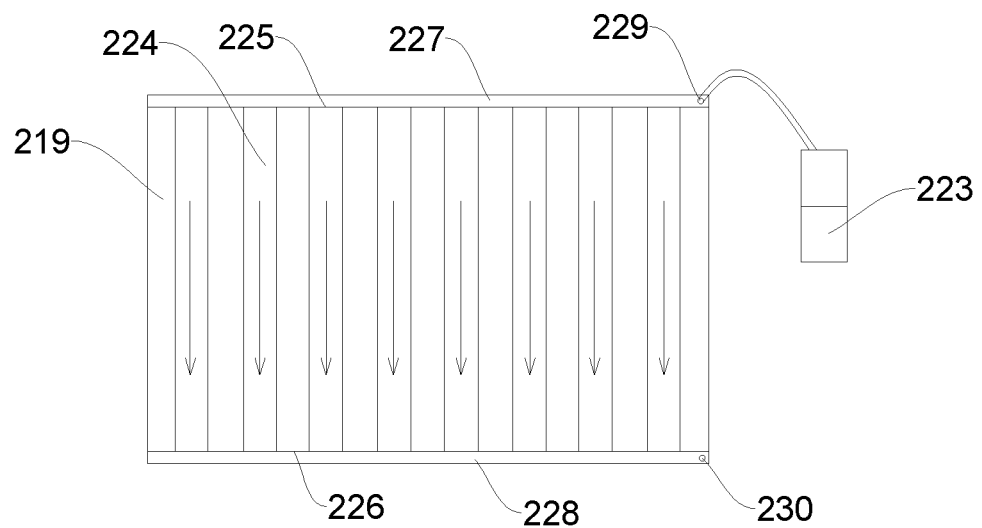
FIG. 23 is a schematic plan view of a liquid cooling plate according to another implementation of this application.
Figure 24:
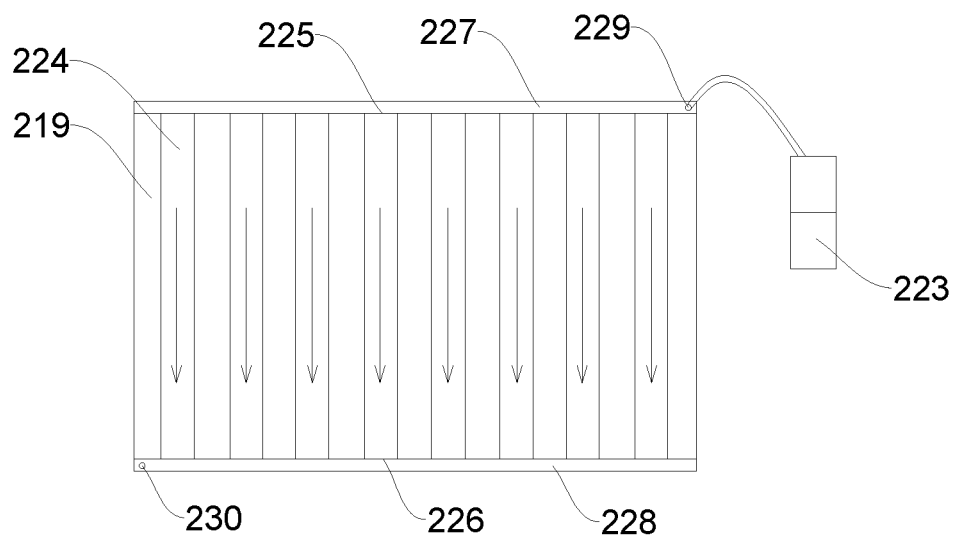
FIG. 24 is a schematic plan view of a liquid cooling plate according to yet another implementation of this application.

In another implementation, as shown in FIG. 23 and FIG. 24, the heat exchange plate 219 has a plurality of cooling liquid pipes 224. The plurality of cooling liquid pipes 224 are straight pipelines and are arranged parallel to each other at intervals. Two ends of each cooling liquid pipe 224 respectively have a cooling liquid inlet 225 and a cooling liquid outlet 226 disposed opposite to each other. The cooling liquid inlets 225 and the cooling liquid outlets 226 of the plurality of cooling liquid pipes 224 are sequentially disposed at intervals along an arrangement direction of the plurality of cooling liquid pipes 224. The battery pack further includes a main liquid inlet pipe 227 and a main liquid outlet pipe 228. Each cooling liquid inlet 225 is in communication with the main liquid inlet pipe 227, and each cooling liquid outlet 226 is in communication with the main liquid outlet pipe 228. As shown in FIG. 23 and FIG. 24, a main cooling liquid inlet 229 is disposed on the main liquid inlet pipe 227, and a main cooling liquid outlet 230 is disposed on the main liquid outlet pipe 228. The main cooling liquid inlet 229 and the main cooling liquid outlet 230 are located on a same side or opposite sides of the heat exchange plate 219.

The rectangular cell 100 may further be cooled through a cooling medium. In another embodiment provided in the disclosure, the panel 212 is a direct cooling plate provided with a cooling structure inside, and a cooling medium is provided inside the direct cooling plate. The cooling medium may be a cooling medium that is cooled through heat dissipation by a vehicle air-conditioning system. A low-temperature cooling medium may effectively absorb heat of the rectangular cell 100 and keep the temperature of the rectangular cell 100 always at an appropriate temperature value. A pipeline in the direct cooling plate and the heat exchange plate 219 may be the same or different.

Based on the foregoing, when a dimension of the battery pack is greater than 600 mm, compared to the prior art, a dimension of a cell may be designed to be longer in this application, up to 2500 mm. The technical effects brought by matching the dimension of the cell with the dimension of the battery pack are as follows.

(1) A volume utilization of the battery pack is significantly improved, and a volume energy density of the battery pack is increased: a current volume utilization in the industry is about 40%, and it is designed that cells may be distributed in an entire interior of the battery pack, so that the volume utilization may be increased to more than 60%, even to 80%, and a volume energy density thereof is increased by more than 20%. For a same vehicle, by using the battery and arrangement method of the present invention, the energy can be increased by 20%-30%, and a number of kilometers the vehicle can run may further be increased by 20%-30%.

(2) Costs of the battery pack are significantly reduced: a cell itself can bear mechanical strengthening, so that the use of reinforcing ribs of a battery tray may be avoided or reduced, and the manufacturing process of the battery pack is simple to reduce manufacturing costs. In addition, dimensions of the cells of this application may be matched with the dimensions of the battery pack, and the cells may be directly arranged in parallel in the battery pack. There is no need to arrange a plurality of cells in parallel in a module frame defined by two end plates and two side plates and assemble a battery module to a battery pack in the prior art. Dimensions of the cells of this application are long enough, so that a plurality of cells may be directly arranged in parallel in the battery pack, eliminating or reducing the end plate and the side plate used in assembly of the battery module, and a large number of fasteners such as screws for fixing and mounting the battery module, so that the cell is assembled easier, saving a large amount of manpower, materials, and other manufacturing costs, better facilitating popularization of the electric vehicle.

(3) Stability and reliability of the battery pack are increased: The more complicated the battery pack assembly process is, the higher the defect rate is. The possibility that the battery pack becomes loose and is not firmly mounted is further increased, adversely affecting quality of the battery pack, and reducing stability and reliability of the battery pack. By using the cells of this application to assemble into a battery pack, as the assembly process becomes simpler, the stability and reliability of the battery pack increases, and the defect rate of the battery pack decreases.

(4) Heat dissipation performance and safety of the battery pack are significantly improved: the temperature rise of the battery pack is the result of both heat production and heat dissipation. Under the premise of a same capacity, quantity of heat production of the cell becomes a fixed value. In this application, the cell is generally flattened and elongated to achieve a better heat dissipation effect of the cell and reduce the temperature rise of the cell. Under the premise of a certain working condition of the battery, the temperature rise of the battery pack is reduced by using the cell, thereby further greatly improving safety performance of the battery pack.

Based on a significant technical effect brought by the longer cell, in order to achieve the support of the cell for itself, support strength of the housing may be improved through improvement of a molding process and structural design, etc., and an aspect ratio of the housing is controlled within a predetermined range. In this case, internal resistance of the cell may be reduced by optimizing a current collection path and the like. In addition, a liquid injection process may further be improved to resolve the problem of long liquid injection time caused by a longer dimension of the cell.

Description is performed below through Comparative example 1 and Embodiments 1-3, Comparative example 2 and Embodiments 4-5, and Comparative example 3 and Embodiments 6-7. According to the battery pack 10 of the embodiment of this application, energy density and the like are improved through design of arrangement and a dimension parameter, etc. of the rectangular cell 100.

Comparative Example 1

For a battery pack 10 in the related art, as shown in FIG. 1, two transverse beams 500 and one longitudinal beam 600 are disposed in a battery pack housing 200. The two transverse beams 500 and one longitudinal beam 600 divide a rectangular cell 100 into six battery modules 400, each of the battery modules 400 having a side beam and an end beam.

A total volume of the battery pack 10 is 213 L, and a ratio of a total volume of the rectangular cells 100 of the battery pack 10 to a volume of the battery pack 10 is 54.76% (that is, the space utilization is 54.76%), and energy density of the battery pack 10 is 251 Wh/L.

Embodiment 1

For a battery pack 10 according to an embodiment of this application, as shown in FIG. 19, a length direction of a rectangular cell 100 is arranged along a width direction of the battery pack 10, and a plurality of rectangular cells 100 are arranged along a length direction of the battery pack 10, and in a width direction of the battery pack 10, a battery pack housing 200 accommodates two rectangular cells 100. A first transverse beam 700 and a second transverse beam 800 are disposed in the battery pack housing 200. The first transverse beam 700 extends along a width direction of the battery pack 10, a plurality of rectangular cells 100 are arranged along a length of the battery pack 10 to form a cell array 400, and the first transverse beam 700 divides the cell array 400 into two parts along the length direction of the battery pack 10. In addition, for the plurality of rectangular cells 100, two rows of battery packs 400 are disposed along the width direction of the battery pack 10. The second transverse beam 800 is located between two rows of adjacent cell arrays 400. A first frame 201 and a second frame 202 of the battery pack housing 200 located on both sides of the width direction of the battery pack 10 provide a support force for the rectangular cell 100, and a third frame 203 and a fourth frame 204 of the battery packing housing 200 located on both ends of the length direction of the battery pack 10 provide an inward pressing force for an adjacent rectangular cell 100. Two layers of cell arrays 400 are disposed in the battery pack housing 200 along a height direction of the battery pack 10. No end beam or side beam is disposed for the cell array 400 (or understood as a battery module) of the battery pack 10.

In this embodiment, a ratio of a sum of volumes of the rectangular cells 100 of the battery pack 10 to a volume of the battery pack 10 is 57.39% (that is, the space utilization is 57.39%), and energy density of the battery pack 10 is 252 Wh/L.

Embodiment 2

For a battery pack 10 according to an embodiment of this application, as shown in FIG. 18, a length direction of a rectangular cell 100 is arranged along a width direction of the battery pack 10, a plurality of rectangular cells 100 are arranged along a length direction of the battery pack 10, and in a width direction of the battery pack 10, a battery pack housing 200 accommodates one rectangular cell 100, and the rectangular cell 100 extends from one side to the other side of the battery pack housing 200 in a width direction of the battery pack 10. A first transverse beam 700 and no second transverse beam 800 are disposed in the battery pack housing 200. The first transverse beam 700 extends along a width direction of the battery pack 10, a plurality of rectangular cells 100 are arranged along a length direction of the battery pack 10 to form a cell array 400, and the first transverse beam 700 divides the cell array 400 into two parts along the length direction of the battery pack 10. A first frame 201 and a second frame 202 of the battery pack housing 200 located on both sides of the width direction of the battery pack 10 provide a support force for the rectangular cell 100, and a third frame 203 and a fourth frame 204 of the battery packing housing 200 located on both ends of the length direction of the battery pack 10 provide an inward pressing force for an adjacent rectangular cell 100. Two layers of cell arrays 400 are disposed in the battery pack housing 200 along a height direction of the battery pack 10. No end beam or side beam is disposed for the cell array 400 (or understood as a battery module) of the battery pack 10.

In this embodiment, a ratio of a sum of volumes of the rectangular cells 100 of the battery pack 10 to a volume of the battery pack 10 is 59.70% (that is, the space utilization is 59.70%), and energy density of the battery pack 10 is 268 Wh/L.

Embodiment 3

Figure 20:
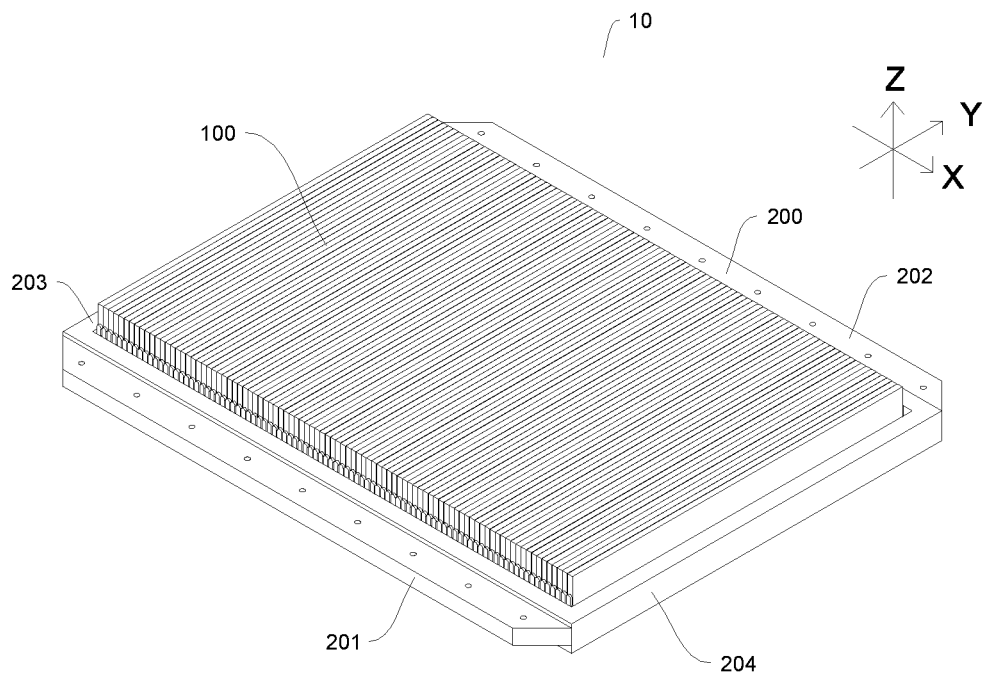
FIG. 20 is a schematic structural three-dimensional view of a battery pack according to another implementation of this application, the cell array including a single layer.

For a battery pack 10 according to an embodiment of this application, as shown in FIG. 20, a length direction of a rectangular cell 100 is arranged along a width direction of the battery pack 10, a plurality of rectangular cells 100 are arranged along a length direction of the battery pack 10, and in a width direction of the battery pack 10, a battery pack housing 200 accommodates one rectangular cell 100, and the rectangular cell 100 extends from one side to the other side of the battery pack housing 200 in a width direction of the battery pack 10. No first beam 700 or second beam 800 is disposed in the battery pack housing 200. A first frame 201 and a second frame 202 of the battery pack housing 200 located on both sides of the width direction of the battery pack 10 provide a support force for the rectangular cell 100, and a third frame 203 and a fourth frame 204 of the battery packing housing 200 located on both ends of the length direction of the battery pack 10 provide an inward pressing force for an adjacent rectangular cell 100. Two layers of cell arrays 400 are disposed in the battery pack housing 200 along a height direction of the battery pack 10. No end beam or side beam is disposed for the cell array 400 (or understood as a battery module) of the battery pack 10.

In this embodiment, a ratio of a sum of volumes of the rectangular cells 100 of the battery pack 10 to a volume of the battery pack 10 is 62.41% (that is, the space utilization is 62.41%), and energy density of the battery pack 10 is 280 Wh/L.

It may be known by those skilled in the art by comparing the foregoing comparative example 1 and embodiments 1-3 that, compared to the battery pack 10 in the related art, for the battery pack 10 according to the embodiment of this application, the grouping efficiency can overcome the limitations of existing battery packs 10 through design of arrangement, dimension parameters, and other factors of the rectangular cell 100, to achieve greater energy density.

Comparative Example 2

For a battery pack 10 in the related art, as shown in FIG. 1, two transverse beams 500 and one longitudinal beam 600 are disposed in a battery pack housing 200. The two transverse beams 500 and one longitudinal beam 600 divide a rectangular cell 100 into six battery modules 400, each of the battery modules 400 having a side beam and an end beam.

A total volume of the battery pack 10 is 310 L, and a ratio of a sum of volumes of the rectangular cells 100 of the battery pack 10 to a volume of the battery pack 10 is 53.49% (that is, the space utilization is 53.49%), and energy density of the battery pack 10 is 245 Wh/L.

Embodiment 4

For a battery pack 10 according to an embodiment of this application, as shown in FIG. 17, a length direction of a rectangular cell 100 is arranged along a width direction of the battery pack 10, a plurality of rectangular cells 100 are arranged along a length direction of the battery pack 10, and in a length direction of the battery pack 10, a battery pack housing 200 accommodates one rectangular cell 100, and the rectangular cell 100 extends from one side to the other side of the battery pack housing 200 in the length direction of the battery pack 10. A second transverse beam 800 and no transverse beam 500 are disposed in the battery pack housing 200. The second transverse beam 800 extends along the length direction of the battery pack 10, a plurality of rectangular cells 100 are arranged along the width direction of the battery pack 10 to form a cell array 400, and the second transverse beam 800 divides the cell array 400 into two parts along the width direction of the battery pack 10. A third frame 203 and a fourth frame 204 of the battery pack housing 200 located at two ends of the length direction of the battery pack 10 provide a support force for the rectangular cell 100, and a first frame 201 and a second frame 202 of the battery pack housing 200 located on two sides of the width direction of the battery pack 10 provide an inward pressing force for the rectangular cell 100. Two layers of cell arrays 400 are disposed in the battery pack housing 200 along a height direction of the battery pack 10. No end beam or side beam is disposed for the cell array 400 (or understood as a battery module) of the battery pack 10.

In this embodiment, a ratio of a sum of volumes of the rectangular cells 100 of the battery pack 10 to a volume of the battery pack 10 is 59.25% (that is, the space utilization is 59.25%), and energy density of the battery pack 10 is 266 Wh/L.

Embodiment 5

Figure 21:
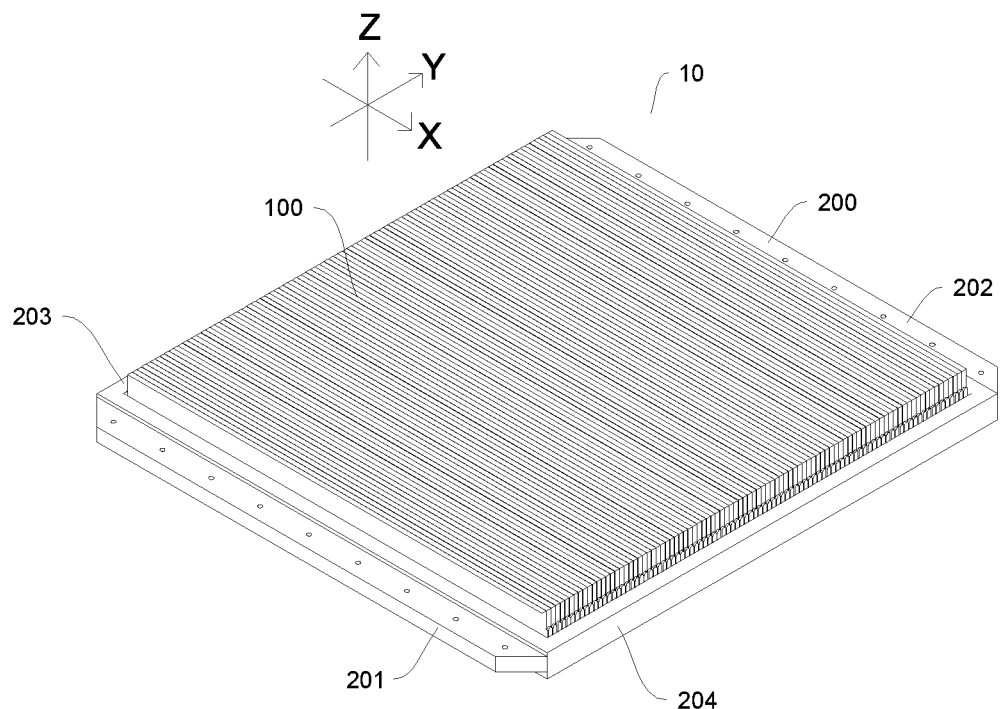
FIG. 21 is a schematic structural three-dimensional view of a battery pack according to another implementation of this application, the cell array including a single layer.

For a battery pack 10 according to an embodiment of this application, as shown in FIG. 21, a length direction of a rectangular cell 100 is arranged along a length direction of the battery pack 10, a plurality of rectangular cells 100 are arranged along a width direction of the battery pack 10, and in a length direction of the battery pack 10, a battery pack housing 200 accommodates one rectangular cell 100, and the rectangular cell 100 extends from one side of the battery pack housing 200 to the other side thereof in the length direction of the battery pack 10. No transverse beam or longitudinal beam is disposed in the battery pack housing 200. A third frame 203 and a fourth frame 204 of the battery pack housing 200 located at two ends of the length direction of the battery pack 10 provide a support force for the rectangular cell 100, and a first frame 201 and a second frame 202 of the battery pack housing 200 located on two sides of the width direction of the battery pack 10 provide an inward pressing force for the rectangular cell 100. Two layers of cell arrays 400 are disposed in the battery pack housing 200 along a height direction of the battery pack 10. No end beam or side beam is disposed for the cell array 400 (or understood as a battery module) of the battery pack 10.

In this embodiment, a ratio of a sum of volumes of the rectangular cells 100 of the battery pack 10 to a volume of the battery pack 10 is 61.23% (that is, the space utilization is 61.23%), and energy density of the battery pack 10 is 275 Wh/L.

Comparative Example 3

For a battery pack 10 in the related art, as shown in FIG. 1, two transverse beams 500 and one longitudinal beam 600 are disposed in a battery pack housing 200. The two transverse beams 500 and one longitudinal beam 600 divide a cell 100 into six battery modules 400, each of the battery modules 400 having a side beam and an end beam.

A ratio of a sum of volumes of the cells 100 of the battery pack 10 to a volume of the battery pack 10 is 60.23% (that is, the space utilization is 60.23%), and energy density of the battery pack 10 is 276 Wh/L.

Embodiment 6

For a battery pack 10 according to an embodiment of this application, as shown in FIG. 21, a length direction of a cell 100 is arranged along a length direction of the battery pack 10, a plurality of cells 100 are arranged along a width direction of the battery pack 10, and in a length direction of the battery pack 10, a battery pack housing 200 accommodates one cell 100, and the cell 100 extends from one side of the battery pack housing 200 to the other side thereof in the length direction of the battery pack 10. No transverse beam or longitudinal beam is disposed in the battery pack housing 200. A third frame 203 and a fourth frame 204 of the battery pack housing 200 located at two ends of the length direction of the battery pack 10 provide a support force for the cell 100, and a first frame 201 and a second frame 202 of the battery pack housing 200 located on two sides of the width direction of the battery pack 10 provide an inward pressing force for the cell 100. Two layers of cell arrays 400 are disposed in the battery pack housing 200 along a height direction of the battery pack 10. No end beam or side beam is disposed for the cell array 400 (or understood as a battery module) of the battery pack 10.

In this embodiment, a ratio of a sum of volumes of the cells 100 of the battery pack 10 to a volume of the battery pack 10 is 72.39% (that is, the space utilization is 72.39%), and energy density of the battery pack 10 is 326 Wh/L.

Embodiment 7

For a battery pack 10 according to an embodiment of this application, as shown in FIG. 21, a length direction of a cell 100 is arranged along a length direction of the battery pack 10, a plurality of cells 100 are arranged along a width direction of the battery pack 10, and in a length direction of the battery pack 10, a battery pack housing 200 accommodates one cell 100, and the cell 100 extends from one side of the battery pack housing 200 to the other side thereof in the length direction of the battery pack 10. No transverse beam or longitudinal beam is disposed in the battery pack housing 200. A third frame 203 and a fourth frame 204 of the battery pack housing 200 located at two ends of the length direction of the battery pack 10 provide a support force for the cell 100, and a first frame 201 and a second frame 202 of the battery pack housing 200 located on two sides of the width direction of the battery pack 10 provide an inward pressing force for the cell 100. Two layers of cell arrays 400 are disposed in the battery pack housing 200 along a height direction of the battery pack 10. No end beam or side beam is disposed for the cell array 400 (or understood as a battery module) of the battery pack 10.

In this embodiment, a ratio of a sum of volumes of the cells 100 of the battery pack 10 to a volume of the battery pack 10 is 73.66% (that is, the space utilization is 73.66%), and energy density of the battery pack 10 is 332 Wh/L.

Specific parameters of Embodiments 1-7 and Comparative examples 1-3 are shown in Table 1.

A sum of a volume of a housing such as the tray and the upper cover and a volume occupied by an internal battery management system and other power distribution modules is only a rough estimated value, which may be slightly different from an accurate value, but the difference is not large and is within an acceptable error range, and therefore does not have great influence on the result.

In the Comparative example 1 and Embodiments 1-3, a total volume of a power battery pack: 213 L(1380*1005*137*0.000001+22.5); a length of the pack=1380 mm, a width thereof=1005 mm, and a thickness thereof=137 mm; the sum of the volume of the housing such as the tray and the upper cover and the volume occupied by the internal battery management system and other power distribution modules: 58 L; and an actual remaining volume that can accommodate a cell and/or transverse beam or longitudinal beam: 155 L.

In the Comparative example 2 and Embodiments 4-5, a total volume of a power battery pack: 310 L(=1580*1380*137*0.000001+11) a length of a pack=1580 mm, a width thereof=1380 mm, and a thickness thereof=137 mm; the sum of the volume of the housing such as the tray and the upper cover and the volume occupied by the internal battery management system and other power distribution modules: 89 L; and an actual remaining volume that can accommodate a cell and/or transverse beam or longitudinal beam: 221 L.

In the Comparative example 3 and Embodiments 6, a total volume of a power battery pack: 414 L(=2130*1380*137*0.000001+11); a length of the pack=2130 mm, a width thereof=1380 mm, and a thickness thereof=137 mm; the sum of the volume of the housing such as the tray and the upper cover and the volume occupied by the internal battery management system and other power distribution modules: 58 L; and an actual remaining volume that can accommodate a cell and/or transverse beam or longitudinal beam: 312 L.

In the embodiment 7, a total volume of a power battery pack: 508 L(=2630*1380*137*0.000001+11), a length of the pack=2630 mm, a width thereof=1380 mm, and a thickness thereof=137 mm; the sum of the volume of the housing such as the tray and the upper cover and the volume occupied by the internal battery management system and other power distribution modules: 119 L; and an actual remaining volume that can accommodate a cell and/or transverse beam or longitudinal beam: 389 L.

TABLE 1

| | Comparative example 1 | Embodiment 1 | Embodiment 2 | Embodiment 3 | Comparative example 2 | Embodiment 4 | Embodiment 5 | Comparative example 3 | Embodiment 6 | Embodiment 7 |
|---|---|---|---|---|---|---|---|---|---|---|
| Dimensions of cell: length, width, and height | 208 * 118 * 13.5 | 435 * 118 * 13.5 | 905 * 118 * 13.5 | 905 * 118 * 13.5 | 208 * 118 * 13.5 | 1280 * 118 * 13.5 | 1280 * 118 * 13.5 | 208 * 118 * 13.5 | 2000 * 118 * 13.5 | 2500 * 118 * 13.5 |
| Number | 352 | 176 | 88 | 92 | 500 | 90 | 93 | 752 | 94 | 94 |
| Cell capacity (Ah) | 47.5 | 95 | 202 | 202 | 47.5 | 286 | 286 | 47.5 | 448 | 561 |
| Quantity of electricity of cell (Wh) | 152 | 304 | 646.4 | 646.4 | 152 | 915.2 | 915.2 | 152 | 1434 | 1795 |
| Cell volume (L) | 0.331 | 0.693 | 1.442 | 1.442 | 0.331 | 2.039 | 2.039 | 0.331 | 3 | 4 |
| Capacity of cell accommodating cavity (L) | 150 | 151 | 152 | 155 | 219 | 220 | 221 | 334 | 356 | 389 |
| Energy density of cell (Wh/L) | 459 | 439 | 448 | 448 | 459 | 449 | 449 | 459 | 450 | 451 |
| Dimension (mm) of vehicle body in the extension direction of the cell | 1880 | 1880 | 1880 | 1880 | 1950 | 1950 | 1950 | 4700 | 4700 | 5200 |
| Frontal projected area of the cell at bottom plate (mm$^2$) | 988416 | 1033560 | 1075140 | 1124010 | 1404000 | 1555200 | 1607040 | 2111616 | 2538000 | 3172500 |

TABLE 1-continued

| | Comparative example 1 | Embodiment 1 | Embodiment 2 | Embodiment 3 | Comparative example 2 | Embodiment 4 | Embodiment 5 | Comparative example 3 | Embodiment 6 | Embodiment 7 |
|---|---|---|---|---|---|---|---|---|---|---|
| Total area of the bottom plate (mm$^2$) | 1386900 | 1386900 | 1386900 | 1386900 | 2180400 | 2180400 | 2180400 | 2939400 | 2939400 | 3629400 |
| Quantity of electricity of battery pack (Wh) | 53504 | 53504 | 56883.2 | 59468.8 | 76000 | 82368 | 85113.6 | 114304 | 134758.4 | 168748.8 |
| Overall volume of battery pack (L) | 213 | 213 | 213 | 213 | 310 | 310 | 310 | 414 | 414 | 508 |
| Energy density of battery pack (Wh/L) | 251 | 252 | 268 | 280 | 245 | 266 | 275 | 276 | 326 | 332 |
| Space utilization (%) | 54.76% | 57.39% | 59.70% | 62.41% | 53.49% | 59.25% | 61.23% | 60.23% | 72.39% | 73.66% |
| Total volume of cells/Capacity of cell accommodating cavity | 77.76% | 80.77% | 83.46% | 85.57% | 75.65% | 83.42% | 85.81% | 74.63% | 84.13% | 96.33% |
| Length of cell/Width of the vehicle body along the cell extension direction | 44.26% | 46.28% | 48.14% | 48.14% | 42.67% | 65.64% | 65.64% | 35.40% | 42.55% | 48.08% |
| Frontal projected area of the cell at the bottom plate/Bottom plate area | 71.27% | 74.52% | 77.52% | 81.04% | 64.39% | 71.33% | 73.70% | 71.84% | 86.34% | 87.41% |

It may be known by those skilled in the art by comparing the foregoing Comparative example 1 to Embodiments 1-3, Comparative example 2 to Embodiments 4-5, and Comparative example 3 to Embodiments 6-7 that, for the battery pack 10 according to the embodiment of this application, the space utilization can overcome the limitations of existing battery packs 10 through design of arrangement, dimension parameters, and other factors of the rectangular cell 100, to achieve greater energy density. In addition, the increase in energy density is magnified as the overall volume of the battery pack 10 is increased. In other words, for a battery pack 10 with a larger volume, energy density is more significantly improved by using the solution of the embodiment of this application.

As shown in FIG. 25 to FIG. 29, this application further discloses a vehicle 1.

The vehicle 1 of this application includes the battery pack 10 of any of the foregoing embodiments. The vehicle 1 of this application may be an electric vehicle, including electric vehicles that need the battery pack 10 to provide electric energy for itself to drive, such as a commercial vehicle, a special vehicle, an electric bicycle, an electric motorcycle, an electric scooter, and the like.

The battery pack 10 is disposed at a bottom of the vehicle 1, and a battery pack housing 200 is fixedly connected to a chassis of the vehicle 1. A tray of the battery pack 10 may be disposed independently or integrated with the chassis of the vehicle 1.

In some embodiments, the electric vehicle includes a battery pack 10 disposed at the bottom of the electric vehicle, and the battery pack housing 200 is fixedly connected to the chassis of the electric vehicle. A first direction is a width direction of a body of the electric vehicle, that is, a left-right direction of the electric vehicle, and a second direction is a length direction of the body of the electric vehicle, that is, a front-rear direction of the electric vehicle. The electric vehicle includes a battery pack 10 disposed at the bottom of the electric vehicle. A width direction of the battery pack 10 is arranged along the width direction of the body of the electric vehicle, and a length direction of the battery pack 10 is arranged along the length direction of the body of the electric vehicle.

In other embodiments, the electric vehicle may include a plurality of battery packs 10 disposed at the bottom of the electric vehicle. A shape and a dimension of the plurality of battery packs 10 may be the same or different. Each battery pack 10 may be adjusted according to a shape and a dimension of the chassis of the electric vehicle, and the plurality of battery packs 10 are arranged along the length direction of the body of the vehicle, that is, the front-rear direction.

In some embodiments, a width F of the battery pack and a width W of the body of the vehicle meet: 50%≤F/W≤80%.

In some embodiments, a length direction of the rectangular cell 100 is arranged along a width direction of the battery pack 10, and in a width direction of an electric vehicle, a length L of the rectangular cell and a width W of the body of the vehicle 100 meet: 46%≤L/W≤76%, 500 mm≤W≤2000 mm.

In some embodiments, in an embodiment provided in the disclosure, a ratio of a width L3 of the battery pack housing 200 in the first direction to the width W of the body of the vehicle meets: 50%≤L3/W≤80%. In this implementation, the ratio may be achieved by disposing one battery pack housing 200 along the width direction of the body of the vehicle. When there is a plurality of battery pack housings 200, the plurality of battery pack housings 200 are arranged along the length direction of the body of the vehicle. Generally, for most vehicles 1, a width of the body is 500 mm-2000 mm, for example, 500 mm, 1600 mm, 1800 mm, 2000 mm, the length of the body is 500 mm-5000 mm. For a passenger vehicle, a width of the passenger vehicle is usually 500 mm-1800 mm, and a length of the body is 500 mm-4000 mm.

In some embodiments, a ratio of a length L4 of the rectangular cell 100 in a first direction to the width W of the body meets: 46%≤L4/W≤76%. In consideration of thicknesses of a first frame 201 and a second frame 202 of the battery pack housing 200, when the ratio of the length L4 of the rectangular cell 100 in the first direction to the width W of the body of the vehicle meets: 46%≤L4/W≤76%. In this implementation, the ratio may be achieved by disposing only one rectangular cell 100 along the width direction of the body of the vehicle. In other possible implementations, in a case that such dimension requirements are met, the ratio may be achieved by disposing a plurality of cell arrays 400 or a plurality of rectangular cells 100 in the length direction. As an implementation, the length L4 of the rectangular cell 100 in the first direction is 500 mm-1000 mm.

It should be noted that, in some embodiments of this application, although a solution in which both ends of a rectangular cell 100 are respectively supported on the first frame 201 and the second frame 202 through fitting is disclosed, in an actual production process, a rectangular cell 100 with a length matching the width of the body of the vehicle cannot be manufactured. In other words, the rectangular cell 100 cannot be processed to have a desired length due to some reasons. This is because the electric vehicle has some requirements on a voltage platform the rectangular cell 100. With a fixed material system, in order to achieve a certain voltage platform, a required volume of the rectangular cell 100 is fixed. Accordingly, if a length of the rectangular cell 100 is increased, a thickness or width thereof is reduced. In addition, a surface area of the entire battery is to be ensured to improve heat dissipation. Under the premise, a length of the rectangular cell 100 cannot be increased by reducing a width (height) of the rectangular cell 100. In this case, the utilization of space in height of the vehicle body is limited. In order to minimize the impact, the width (height) of the rectangular cell 100 is not adjusted generally. Therefore, the surface area of the entire rectangular cell 100 is changed only by changing the length of the rectangular cell 100 along the first direction and the thickness thereof along the second direction. Therefore, it is probable to increase the length by reducing the thickness. Actually, because a pole core and related materials need to be added to an interior of the rectangular cell 100, a change in the thickness of the rectangular cell has a minimum limit value. Accordingly, because the length of the rectangular cell 100 is affected by the limit value of the thickness, the length of the rectangular cell 100 along the first direction is changed limitedly, and cannot be increased limitlessly.

Therefore, in some embodiments, the foregoing problem is resolved by disposing two rectangular cells 100 in the first direction. For example, in the original solution in which one rectangular cell 100 is disposed along the first direction, the length of the rectangular cell 100 along the first direction is 1000 mm. After the solution is used, two rectangular cells 100 are disposed in the first direction, and a length of each rectangular cell 100 is about 450 mm. The reason why the length is less than a half of the original length of 1000 mm is because a mounting position is to be added in the middle.

This application further discloses an energy storage device 2.

Figure 30:
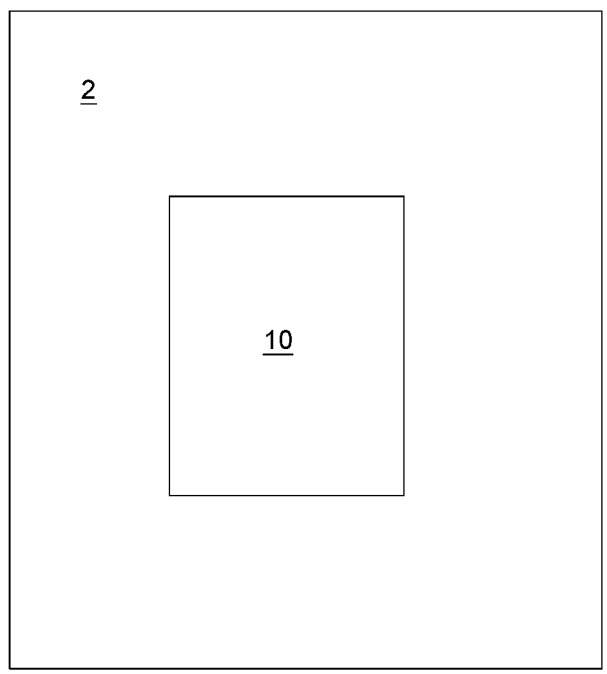
FIG. 30 is a schematic structural view of an energy storage device according to an implementation of this application.

As shown in FIG. 30, the energy storage device 2 of this application includes the battery pack 10 according to any of the foregoing embodiments. The energy storage device 2 of this application may be used for a backup power supply for family use, a backup power supply for commercial use, an outdoor power supply, peak-shaving energy storage equipment for a power station, power sources for various vehicles, and the like.

A battery pack includes: a battery pack housing and a plurality of rectangular cells, the battery pack housing having a first direction and a second direction perpendicular to the first direction; where the battery pack has a dimension greater than or equal to 600 mm along the first direction, and at least one rectangular cell accommodating unit is formed in the battery pack housing; the plurality of rectangular cells are arranged in the rectangular cell accommodating unit along the second direction; the rectangular cell extends along the first direction, and one rectangular cell is disposed in each rectangular cell accommodating unit along the first direction; the rectangular cell has a thickness of D, a length of L, and a height of H; the battery pack has a dimension greater than or equal to L along the first direction; and a length direction of at least one rectangular cell extends from one side of the length direction to the other side of the length direction along the first direction, and meets: L>H, L>D, 600 mm≤L≤2500 mm, 23≤L/D≤208.

In some embodiments, the rectangular cell has a volume of V, and the at least one cell meets: 0.0005 mm-2≤L/V≤0.002 mm-2.

In some embodiments, the at least one rectangular meets: 600 mm≤L≤1000 mm.

In some embodiments, the at least one rectangular meets: 50≤L/D≤70.

In some embodiments, the battery pack housing includes a bottom housing and a sealing cover, the bottom housing being connected to the sealing cover to form the at least one rectangular cell accommodating unit.

In some embodiments, a first beam is disposed in the battery pack housing and extends along the first direction; the first transverse beam being configured to divide an interior of the battery pack housing into two rectangular cell accommodating units.

In some embodiments, a second beam is disposed in the battery pack housing and extends along the second direction; the second transverse beam being configured to divide an interior of the battery pack housing into two rectangular cell accommodating units.

In some embodiments, a first beam and a second beam are disposed in the battery pack housing, the first beam extending along the first direction, the second beam extending along the second direction, and the first beam and the second beam intersecting and dividing an interior of the battery pack housing into four rectangular cell accommodating units.

In some embodiments, the bottom housing is a tray, the tray including a first frame and a second frame disposed opposite to each other along the first direction, a rectangular cell accommodating unit being formed between the first frame and the second frame, one end of the rectangular cell being supported on the first frame, and the other end being supported on the second frame.

In some embodiments, the first frame and the second frame respectively include an inner wall surface matching two end surfaces of the rectangular cell, an insulating plate being respectively sandwiched between the inner wall surfaces of the first frame and the second frame and the end surfaces of the rectangular cell.

In some embodiments, the inner wall surfaces of the first frame and the second frame facing toward the rectangular cell have a protruding support plate, a support surface being disposed on a side of the support plate facing toward the sealing cover and being configured to support a rectangular cell, and a side of the support plate away from the sealing cover having a mounting surface for mounting a bottom plate of the battery pack housing, and the support plate, the rectangular cell, and the bottom plate jointly defining a heat preservation cavity for accommodating a heat preservation layer.

In some embodiments, an inner ring at an end of the first frame and the second frame away from the sealing cover has an annular sink, a bottom wall of the sink forming the mounting surface, and the bottom plate being mounted to the sink.

In some embodiments, inner wall surfaces of the first frame and the second frame facing toward the rectangular cell each have a first connection surface, a distance from the first connection surface to the sealing cover being less than a distance from the support surface to the sealing cover, and the rectangular cell being connected to the first connection surface.

In some embodiments, the inner wall surface of the first frame or the second frame facing toward the rectangular cell has at least two steps, where two step surfaces form the first connection surface and the support surface respectively.

In some embodiments, the following is further included: an end plate disposed at both ends of the rectangular cell along a length direction of the rectangular cell, the rectangular cell being connected to the first connection surface through the end plate.

In some embodiments, the end plate includes: an end plate body disposed opposite to the end surface of the rectangular cell and a first connection plate connected to the end plate body and protruding toward the first connection surface, the first connection plate being connected to the first connection surface.

In some embodiments, an explosion-proof valve is disposed on least one of two end surfaces of the rectangular cell, a via corresponding to the explosion-proof valve being disposed on an end plate body of at least one of the two end plates, an exhaust hole corresponding to the via and an exhaust channel in communication with the exhaust hole being disposed on at least one of the first frame and the second frame.

In some embodiments, a management accommodating cavity for accommodating a battery management component and a power distribution component is defined between the first connection surface and the sealing cover.

In some embodiments, the tray includes a bottom plate, and the rectangular cell and the bottom plate are disposed at intervals.

In some embodiments, a heat preservation layer is disposed between the rectangular cell and the bottom plate.

In some embodiments, the tray further includes a third frame and a fourth frame disposed opposite to each other along the second direction, the third frame and the fourth frame providing an inward pressing force for a rectangular cell adjacent to the third frame and the fourth frame.

In some embodiments, the battery pack further includes: an elastic device elastically sandwiched in at least one position between the third frame and a rectangular cell adjacent to the third frame and between the fourth frame and a rectangular cell adjacent to the fourth frame.

In some embodiments, the following is further included: a side plate disposed between the third frame and the rectangular cell adjacent to the third frame and between the fourth frame and the rectangular cell adjacent to the fourth frame.

In some embodiments, the side plate includes a side plate body disposed opposite to a side surface of the rectangular cell and a second connection plate connected to the side plate body and protruding toward the third frame or the fourth frame, a second connection surface facing toward the sealing cover being disposed on the third frame and the fourth frame and being connected to the second connection plate.

In some embodiments, the following is further included: a panel connected to an upper surface and a lower surface of the rectangular cell; an end plate disposed on two end surfaces of the rectangular cell; and a side plate disposed on external side surfaces of two outermost rectangular cells; where both the end plate and the side plate are connected to two panels, and inner wall surfaces of the first frame and the second frame facing toward the rectangular cell have a support surface and a connection surface, two ends of the rectangular cells being supported on the support surfaces, and the end plate and the side plate being connected to the connection surface.

In some embodiments, the following is further included: a heat exchange plate mounted to the upper surface of the rectangular cell.

In some embodiments, the rectangular cell has a volume of V and a height of H and meets: $0.0001$ m-2$\leq$H/V$\leq$0.00015 mm-2.

In some embodiments, the rectangular cell has a length of L, a height of H, and a thickness of D, where $4\leq L/H \leq 21$.

What is claimed is:

1. A battery pack, comprising:
   a battery pack housing, defining a first direction and a second direction perpendicular to the first direction,
   a rectangular cell accommodating unit, disposed in the battery pack housing, and
   a plurality of rectangular cells adjacent to each other and generally disposed along the second direction in the rectangular cell accommodating unit, each of the plurality of rectangular cells defining a thickness of D, a length of L, a height of H, and a volume of V,
   wherein the battery pack has a dimension of at least 600 mm along the first direction;
   the battery pack has a dimension greater than or equal to L along the first direction;
   wherein only one of the plurality of rectangular cells is disposed along the first direction in the rectangular cell accommodating unit; and
   a length of at least one rectangular cell extends from one side of the rectangular cell accommodating unit to the other side of the rectangular cell accommodating unit along the first direction, and meets: L>H, L>D, 600 mm≤L≤2500 mm, 23≤L/D≤208, 0.0005 mm$^{-2}$≤L/V≤0.002 mm$^{-2}$, 4≤L/H≤21, wherein the battery pack housing comprises a bottom housing and a sealing cover, the bottom housing and the sealing cover form the rectangular cell accommodating unit, wherein the bottom housing is a tray, the tray comprises a first frame and a second frame disposed opposite to each other along the first direction, the rectangular cell accommodating unit is formed between the first frame and the second frame, wherein one end of a subset of the plurality of rectangular cells is supported on the first frame, and wherein the other end of the subset of the plurality of rectangular cells is supported on the second frame.

2. The battery pack according to claim 1, wherein the at least one rectangular cell meets: 600 mm≤L≤1000 mm, and 50≤L/D≤70.

3. The battery pack according to claim 1, wherein a first transverse beam is disposed in the battery pack housing and extends along the first direction; the first transverse beam separates an interior of the battery pack housing into two rectangular cell accommodating units.

4. The battery pack according to claim 1, wherein a second transverse beam is disposed in the battery pack housing and extends along the second direction; the second transverse beam separates an interior of the battery pack housing into two rectangular cell accommodating units.

5. The battery pack according to claim 1, wherein a first transverse beam and a second transverse beam are disposed in the battery pack housing, the first transverse beam extends along the first direction, the second transverse beam extends along the second direction, and the first transverse beam and the second transverse beam intersects and separates an interior of the battery pack housing into four rectangular cell accommodating units.

6. The battery pack according to claim 1, wherein inner wall surfaces of the first frame and the second frame facing toward the rectangular cell have a protruding support plate, a side of the support plate facing toward the sealing cover comprises a support surface that supports a rectangular cell, and a side of the support plate away from the sealing cover comprises a mounting surface for mounting a bottom plate of the battery pack housing, and the support plate, the rectangular cell, and the bottom plate jointly defines a heat preservation cavity for accommodating a heat preservation layer.

7. The battery pack according to claim 6, wherein each of the inner wall surfaces of the first frame and the second frame facing toward the rectangular cell comprises a first connection surface, a distance from the first connection surface to the sealing cover is less than a distance from the support surface to the sealing cover, and the rectangular cell is connected to the first connection surface.

8. The battery pack according to claim 7, further comprising:
end plates disposed at both ends of the rectangular cell along a length direction of the rectangular cell, the rectangular cell is connected to the first connection surface through the end plate;
wherein the end plate comprises: an end plate body corresponding to end surfaces of the rectangular cell and a first connection plate connected to the end plate body and protruding toward the first connection surface, the first connection plate is connected to the first connection surface.

9. The battery pack according to claim 8, wherein at least one of two end surfaces of the rectangular cell comprises an explosion-proof valve, the end plate body of the at least one end plate comprises a via corresponding to the explosion-proof valve, and at least one of the first frame and the second frame comprises an exhaust hole corresponding to the via and an exhaust channel in communication with the exhaust hole.

10. The battery pack according to claim 7, wherein a management accommodating cavity for accommodating a battery management component and a power distribution component is defined between the first connection surface and the sealing cover.

11. The battery pack according to claim 1, wherein the tray comprises a bottom plate, and the rectangular cell and the bottom plate are disposed at intervals.

12. The battery pack according to claim 1, wherein the tray further comprises
a third frame and a fourth frame disposed opposite to each other along the second direction, the third frame and the fourth frame provides a pressure for rectangular cells adjacent to the third frame and the fourth frame;
the battery pack further comprising:
a side plate disposed between the third frame and the rectangular cell adjacent to the third frame and between the fourth frame and the rectangular cell adjacent to the fourth frame;
wherein the side plate comprises a side plate body corresponding to side surfaces of the rectangular cell and a second connection plate connected to the side plate body and protruding toward the third frame or the fourth frame, each of the third frame and the fourth frame comprises a second connection surface facing toward the sealing cover and connected to the second connection plate.

13. The battery pack according to claim 1, further comprising:
panels connected to an upper surface and a lower surface of the rectangular cell;
end plates disposed on two end surfaces of the rectangular cell; and
side plates disposed on external side surfaces of two outermost rectangular cells, wherein both the end plates and the side plates are connected to two panels, and each of inner wall surfaces of the first frame and the second frame facing toward the rectangular cell has a support surface and a connection surface, two ends of the rectangular cells are supported on the support surface, and the end plate and the side plate are connected to the connection surface.

14. The battery pack according to claim 1, further comprising:
a heat exchange plate mounted to the upper surface of the rectangular cell.

15. The battery pack according to claim 1, wherein the rectangular cell meets: 0.0001 m$^{-2}$≤H/V≤0.00015 mm$^{-2}$.

16. A vehicle, comprising the battery pack according to claim 1.

17. The vehicle according to claim 16, wherein the battery pack is disposed at a bottom of the vehicle, the battery pack housing is fixedly connected to a chassis of the vehicle.

18. The vehicle according to claim 17, comprising
a battery pack disposed at the bottom of the vehicle, wherein a width direction of the battery pack is generally arranged along a width direction of a body of the vehicle, and a length direction of the battery pack is generally arranged along a length direction of the body of the vehicle;

wherein a width F of the battery pack and a width W of the body of the vehicle meet: $50\% \leq F/W \leq 80\%$;

wherein a length direction of the rectangular cell is generally arranged along a width direction of the battery pack, and in a width direction of an electric vehicle, a length L of the rectangular cell and the width W of the body of the vehicle meet: $46\% \leq L/W \leq 76\%$;

wherein the width W of the body meets: $500 \text{ mm} \leq W \leq 2000 \text{ mm}$.

* * * * *